(12) United States Patent
Callias et al.

(10) Patent No.: US 9,210,519 B2
(45) Date of Patent: Dec. 8, 2015

(54) HEARING ASSISTANCE SYSTEM AND METHOD

(75) Inventors: Francois Callias, Fontaines (CH); Amre El-Hoiydi, Neuchatel (CH); Claude Richard, Fribourg (CH)

(73) Assignee: Sonova Ag, Staefa (CH)

(*) Notice: Subject to any disclaimer, the term of this patent is extended or adjusted under 35 U.S.C. 154(b) by 362 days.

(21) Appl. No.: 13/642,708

(22) PCT Filed: Apr. 22, 2010

(86) PCT No.: PCT/EP2010/055322
§ 371 (c)(1), (2), (4) Date: Feb. 7, 2013

(87) PCT Pub. No.: WO2011/131241
PCT Pub. Date: Oct. 27, 2011

(65) Prior Publication Data
US 2013/0129126 A1    May 23, 2013

(51) Int. Cl.
*H04R 25/00* (2006.01)
*H02J 7/34* (2006.01)
*H04R 27/02* (2006.01)

(52) U.S. Cl.
CPC .............. *H04R 25/554* (2013.01); *H02J 7/345* (2013.01); *H04R 25/453* (2013.01); *H04R 25/305* (2013.01); *H04R 25/407* (2013.01); *H04R 27/02* (2013.01); *H04R 2225/33* (2013.01);
(Continued)

(58) Field of Classification Search
CPC ...... H04R 25/554; H04R 25/25; H04R 25/55; H04R 25/552; H04R 25/453; H04R 2227/003; H04R 27/02; H04R 2225/33; H02J 7/345
USPC ........................................ 381/315, 94.5, 94.6
See application file for complete search history.

(56) References Cited

U.S. PATENT DOCUMENTS 5,083,095 A   1/1992 Madaffari
5,270,823 A * 12/1993 Heidebroek et al. .......... 348/730
5,701,348 A * 12/1997 Shennib et al. ............... 381/328
(Continued)

FOREIGN PATENT DOCUMENTS

EP    0 902 547 A2   3/1999
EP    1 560 383 A2   8/2005
(Continued)

*Primary Examiner* — Davetta W Goins
*Assistant Examiner* — Oyesola C Ojo
(74) *Attorney, Agent, or Firm* — Roberts Mlotkowski Safran & Cole, PC

(57) ABSTRACT

A system for providing hearing assistance to at least one user, having at least one audio signal source; a transmission unit with a digital transmitter for wirelessly transmitting audio signals as data packets to a frame structure from the audio signal source; at least one ear-worn receiver unit for receiving the transmitted audio signals and a hearing stimulating mechanism, the receiver unit having a digital transceiver adapted to listen, and optionally transmit, during part of each frame and to sleep during the remainder of the frame; wherein the receiver unit has a capacitor for supplying current to the transceiver during listening or transmission operation, and a controlled current source including a control unit for controlling current flowing to the transceiver and the capacitor a manner preventing changes in the current flowing to the transceiver and the capacitor caused by the transceiver switching between sleeping and listening/transmission operation and vice versa.

31 Claims, 13 Drawing Sheets

(52) U.S. Cl.
CPC ....... *H04R2225/55* (2013.01); *H04R 2227/003* (2013.01); *H04R 2460/03* (2013.01)

(56) References Cited

U.S. PATENT DOCUMENTS

| | | | |
|---|---|---|---|
| 5,856,739 A | 1/1999 | Trica | |
| 6,134,130 A * | 10/2000 | Connell et al. | 363/89 |
| 6,737,838 B2 | 5/2004 | Sluijs et al. | |
| 7,529,565 B2 | 5/2009 | Hilpisch et al. | |
| 7,778,045 B2 | 8/2010 | Alexander | |
| 7,778,432 B2 | 8/2010 | Larsen | |
| 7,825,646 B2 * | 11/2010 | Ishii et al. | 323/285 |
| 8,190,189 B2 * | 5/2012 | Lerke | 455/522 |
| 8,229,146 B2 | 7/2012 | Nielsen | |
| 8,442,248 B2 * | 5/2013 | Solum | 381/315 |
| 8,519,680 B2 * | 8/2013 | Murakami | 323/222 |
| 2002/0061012 A1 | 5/2002 | Thi et al. | |
| 2006/0222134 A1 * | 10/2006 | Eldredge et al. | 375/371 |
| 2007/0086601 A1 * | 4/2007 | Mitchler | 381/79 |
| 2007/0259629 A1 * | 11/2007 | Lee et al. | 455/127.1 |
| 2008/0074905 A1 | 3/2008 | Moiseev et al. | |
| 2008/0197193 A1 | 8/2008 | Overhultz et al. | |
| 2008/0232623 A1 | 9/2008 | Solum et al. | |
| 2009/0039869 A1 | 2/2009 | Williams | |
| 2009/0236917 A1 * | 9/2009 | Bettenwort et al. | 307/82 |

FOREIGN PATENT DOCUMENTS

| | | |
|---|---|---|
| EP | 1 863 320 A1 | 12/2007 |
| WO | 2004023637 A1 | 3/2004 |
| WO | 2004110099 A2 | 12/2004 |
| WO | 2008074350 A1 | 6/2008 |
| WO | 2008/138365 A1 | 11/2008 |
| WO | 2008135975 A2 | 11/2008 |

* cited by examiner

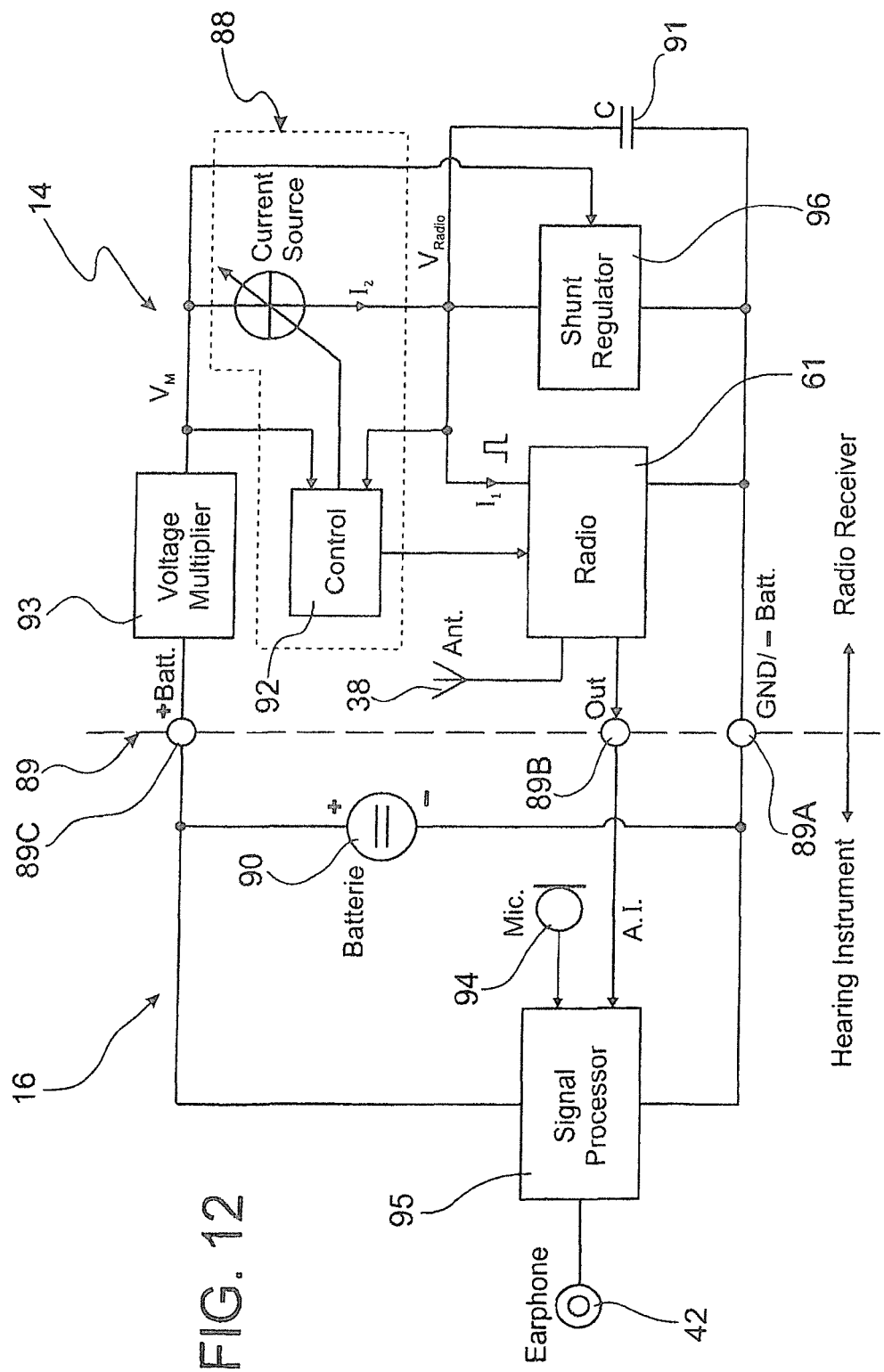

HEARING ASSISTANCE SYSTEM AND METHOD

BACKGROUND OF THE INVENTION

1. Field of the Invention

The invention relates to a system and a method for providing hearing assistance to at least one user, wherein audio signals from an audio signal source, such as a microphone for capturing a speaker's voice, are transmitted via a wireless link to a receiver unit acting as an audio receiver for an ear-worn device, such as a hearing aid.

2. Description of Related Art

Presently, in such systems, the wireless audio link usually is an FM (frequency modulation) radio link. According to a typical application of such wireless audio systems, the receiver unit is connected to or integrated into a hearing instrument, such as a hearing aid, with the transmitted audio signals being mixed with audio signals captured by the microphone of the hearing instrument prior to being reproduced by the output transducer of the hearing instrument. The benefit of such systems is that the microphone of the hearing instrument can be supplemented or replaced by a remote microphone which produces audio signals which are transmitted wirelessly to the FM receiver, and thus, to the hearing instrument. In particular, FM systems have been standard equipment for children with hearing loss in educational settings for many years. Their merit lies in the fact that a microphone placed a few centimeters from the mouth of a person speaking receives speech at a much higher level than one placed several feet away. This increase in speech level corresponds to an increase in signal-to-noise ratio (SNR) due to the direct wireless connection to the listener's amplification system. The resulting improvements of signal level and SNR in the listener's ear are recognized as the primary benefits of FM radio systems, as hearing-impaired individuals are at a significant disadvantage when processing signals with a poor acoustical SNR.

A typical application of such wireless audio systems is at school, wherein the teacher uses a wireless microphone for transmitting the captured audio signals via the transmission unit to receiver units worn by the students. Since the receiver units and the respective hearing aids are usually owned by the students, the receiver units may be of different types within a class.

Another typical application of wireless audio systems is the case in which the transmission unit is designed as an assistive listening device. In this case, the transmission unit may include a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

Examples of analog wireless FM systems particularly suited for school applications are described, for example, in European Patent Application EP 1 863 320 A1 and International Patent Application Publication WO 2008/138365 A1. According to these systems, the wireless link not only serves to transmit audio signals captured by the wireless microphone, but in addition, also serves to transmit control data obtained from analyzing the audio signals in the transmission unit to the receiver unit(s), with such control data being used in the receiver unit to adjust, for example, the gain applied to the received audio signals according to the prevailing ambient noise and the issue of whether the speaker is presently speaking or not.

In applications where the receiver unit is part of or connected to a hearing aid, transmission is usually carried out by using analog FM technology in the 200 MHz frequency band. In recent systems the analog FM transmission technology is replaced by employing digital modulation techniques for audio signal transmission. An example of such a digital system is available from the company Comfort Audio AB, 30105 Halmstad, Sweden under the trademark COMFORT DIGISYSTEM®.

A specific example of an analog wireless FM system particularly suited for school applications is described in International Patent Application Publication WO 2008/074350 A1, wherein the system consists of a plurality of transmission units comprising a microphone and a plurality of analog FM receiver units and wherein only one of the transmission units has an analog audio signal transmitter, while each of the transmission units is provided with a digital transceiver in order to realize an assistive digital link for enabling communication between the transmission units. The assistive digital link also serves to transmit audio signals captured by a transmission unit not having the analog transmitter to the transmission unit having the analog transmitter from where the audio signals are transmitted via the analog FM link to the receiver units.

U.S. Pat. No. 7,778,432 B2 relates to a wireless network for communication of binaural hearing aids with other devices, such as a mobile phone, using slow frequency hopping, wherein each data packet is transmitted in a separate slot of a TDMA frame, with each slot being associated to a different transmission frequency, wherein the hopping sequence is calculated using the ID of the master device, the slot number and the frame number. A link management package (LMP) is sent from the master device to the slave devices in the first slot of each frame. The system may be operated in a broadcast mode. Each receiver is turned on only during the transmission during time slots associated to the respective receiver. The system has two acquisition modes for synchronization, with two different handshake protocols. Eight LMP messages are transmitted in every frame during initial acquisition, and one LMP message is transmitted in every frame once a network is established. Handshake, i.e., bi-directional message exchange, is needed both for initial acquisition and acquisition into the established network. During acquisition, only a reduced number of acquisition channels is used, with the frequency hopping scheme being applied to these acquisition channels. The system operates in the 2.4 GHz ISM band. A similar system is known from U.S. Pat. No. 8,229,146 B2.

International Patent Application Publication WO 2008/135975 A2 relates to a communication network, wherein the receiver wakes up for listening to the preamble of a data packet and goes to sleep again, if no valid preamble is received.

U.S. Patent Application Publication 2007/0086601 A1 relates to a system comprising a transmission unit with a microphone for transmitting a speaker's voice to a plurality of hearing aids via a wireless digital link, which may be unidirectional or bi-directional and which may be used for transmitting both audio data and control data to the hearing aids.

U.S. Pat. No. 7,529,565 B2 relates to a hearing aid comprising a transceiver for communication with an external device, wherein a wireless communication protocol including a transmission protocol, link protocol, extended protocol, data protocol and audio protocol is used. The transmission protocol is adapted to control transceiver operations to provide half duplex communications over a single channel, and the link protocol is adapted to implement a packet transmission process to account for frame collisions on the channel.

European Patent Application EP 1 560 383 A2 relates to a Bluetooth system, wherein the slave device, in a park mode or in a sniff mode, periodically wakes up to listen to transmission from the master and to re-synchronize its clock offset.

U.S. Patent Application Publication 2007/0259629 A1 relates to the transmission of audio signals from a main device, such as a mobile phone, to a peripheral device, such as a headset, in order to establish a wireless personal area network by using an ultra-wide band link, wherein very short pulses of 1 ns or less duration, corresponding to transmission band width of about 500 MHz, are transmitted. In order to reduce power consumption, the transceivers are operated in an interpulse duty cycling mode. In order to better match the peak current consumption from the battery during powered-on times of the interpulse duty cycling to the average current drawn from the battery, a capacitive element is charged when pulses are not being transmitted or received and is then discharged to power the transceiver when pulses are being transmitted or received. It is also mentioned that such system may be used with devices like a microphone and a hearing aid.

In U.S. Pat. No. 5,083,095, which relates to a hearing aid having a microphone preamplifier using a junction field effect transistors (JFET), in order to enhance power supply rejection, it is mentioned that, due to the internal impedance of the power source, in connection with the relatively low power supply voltage, the power output stage may contribute a signal which, due to the high current drawn through the power supply impedance, is equal to or greater than the wanted signal. It is also mentioned that such ripple signals may be reduced by placing a capacitor across the power leads or by placing a large resistor between the power lead and the stage to be isolated, with a capacitor across the normal leads of that stage. It is also mentioned that the drawback of such solutions employing a RC-filter is the relatively large capacitor required therefore.

U.S. Patent Application Publication 2008/0232623 A1 relates to a hearing aid which is recharged via the direct audio input by a battery included in a wireless communication device attached to the hearing aid via the direct audio input, with the transceiver of the communication device likewise being powered by that battery.

U.S. Pat. No. 6,737,838 B2 relates to a DC/DC up/down converter, wherein first a supply voltage is converted to a lower voltage through a step-down DC/DC converter (buck converter) and then, during specific phases of work also the higher voltage is generated from the lower voltage using the same coil in a step-up converter (boost converter) architecture.

Conventional radio receiver units ("boots") for hearing aids typically use FM-modulation in the VHF frequency band (169 to 220 MHz) and are connected to the hearing aid through a 3-pin plug-in interface having an audio signal pin, a power pin and a common ground pin, wherein the radio receiver boot is powered by the hearing aid battery. The hearing aid typically is provided with a so-called audio shoe, provided by the hearing aid manufacturer, for connection to the standard 3-pin interface. Typically, the batteries of the hearing aid provide for a supply voltage between 1 and 1.5 V, wherein a typical current consumption of, for example, a BTE hearing aid is between 1 and 2 mA. A digital transceiver operating in the 2.4 GHz band typically needs a supply voltage of 1.5 to 3 V and requires a typical current of 25 mA.

SUMMARY OF THE INVENTION

It is an object of the invention to provide for a hearing assistance system employing a digital audio link, wherein the receiver unit is powered by the battery of an ear-worn device comprising the stimulation means and wherein noise signals due to current ripples should be avoided. It is also an object of the invention to provide for a corresponding hearing assistance method.

According to the invention, these objects are achieved by a hearing assistance system and a hearing assistance method as described herein.

The invention is beneficial in that, by providing the receiver unit with a capacitor connected in parallel to the transceiver for supplying the transceiver during listening or transmission operation with current and for being recharged by the power supply of the ear-worn device, when the transceiver is sleeping and with a controlled current source for controlling the current flowing from the power source to the transceiver and the capacitor in a manner so as to prevent changes in that current which are expected to add an audible noise signal to the audio signals supplied to the stimulation means, the transceiver can be operated in a duty cycling mode for reducing power consumption, while nevertheless noise signals, which otherwise would be caused by the fast changes in the current consumed by the transceiver when switching between the sleeping state and the active listening/transmission state and vice-versa, can be prevented. By using a capacitor to provide for the necessary current peaks in the current consumed by the transceiver, the controlled current source is able to keep the current supplied by the power source close to the average current consumed by the transceiver.

Preferably, the controlled current source is adapted to adjust the current flowing from the power source to the transceiver and the capacitor to a constant target current value selected according to the estimated quality of the audio link (or according to the estimated average current consumption of the transceiver). The current flowing from the power source to the transceiver may be kept within −0% . . . +20% at the target value. In case of a change of the estimated quality of the audio link, the current may be adjusted to a new target current value corresponding to the changed quality of the audio link with a time constant of at least 0.05 sec. The target current value preferably is selected as the estimated average current to be consumed by the transceiver plus a safety overhead to account for transient changes in link quality. The link quality may be estimated from an output signal of the transceiver indicative of the packet level error rate and/or the bit level error rate of the received audio signals.

Preferably, the controlled current source is adapted to monitor the voltage across the transceiver in a manner so as to keep it below a given threshold. To this end, dummy discharge of the capacitor may be caused. According to one example, the receiver unit may comprise a shunt circuit connected in parallel to the capacitor. The shunt circuit may comprise a load resistance, which is periodically switched on by the controlled current source. It can also be a circuit operating in an independent manner, as to prevent the voltage across the transceiver to go over a maximum value and/or to prevent the voltage across the current source to fall below a minimum value. Alternatively or addition, the transceiver may be forced to carry out dummy listening operation.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 12 is a more detailed block diagram of an example of the receiver unit of FIG. 11;

DETAILED DESCRIPTION OF THE INVENTION

The present invention relates to a system for providing hearing assistance to at least one user, wherein audio signals are transmitted, using a transmission unit comprising a digital transmitter, which transmits from an audio signal source via a wireless digital audio link to at least one receiver unit, from which the audio signals are supplied to means for stimulating the hearing of the user, typically a loudspeaker.

Figure 1:
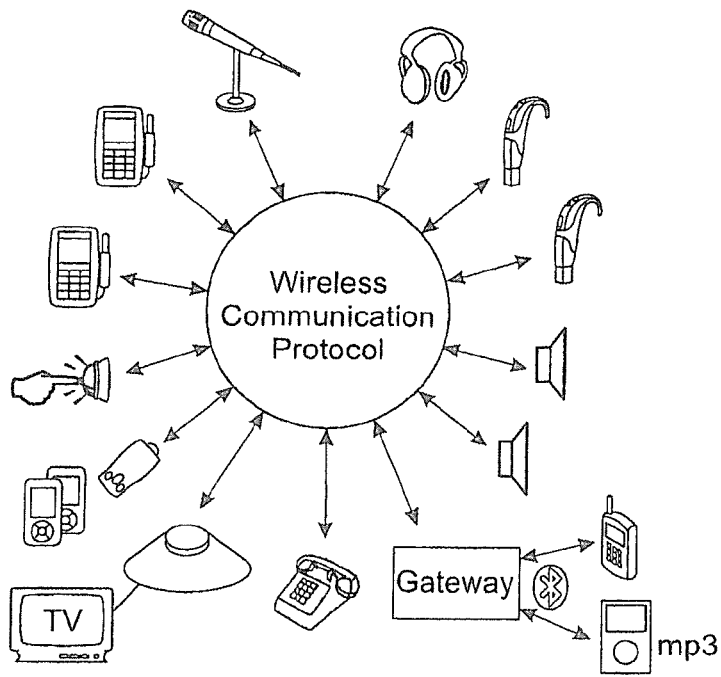
FIG. 1 illustrates the variety of audio components which can be used with a system according to the invention.

As shown in FIG. 1, the device used on the transmission side may be a wireless microphone used by a speaker in a room for an audience; an audio transmitter having an integrated or a cable-connected microphone as are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player; etc. The transmission devices include body-worn devices as well as fixed devices. The devices on the receiver side include ear-worn devices, such as all kinds of hearing aids and ear pieces. The receiver devices may be for hearing-impaired persons or for normal-hearing persons.

The system may include a plurality of devices on the transmission side and a plurality of devices on the receiver side, for implementing a network architecture, usually in a master-slave topology.

The transmission unit typically comprises or is connected to a microphone for capturing audio signals, which is typically worn by a user, with the voice of the user being transmitted via the wireless audio link to the receiver unit.

The receiver unit is connected to or integrated within an ear-worn device. Typically, receiver unit is connected to a hearing aid via an audio shoe or is integrated within a hearing aid.

Usually, in addition to the audio signals, control data is transmitted bi-directionally between the transmission unit and the receiver unit. Such control data may include, for example, volume control or a query regarding the status of the receiver unit or of the device connected to the receiver unit (for example, battery state and parameter settings).

Figure 2:
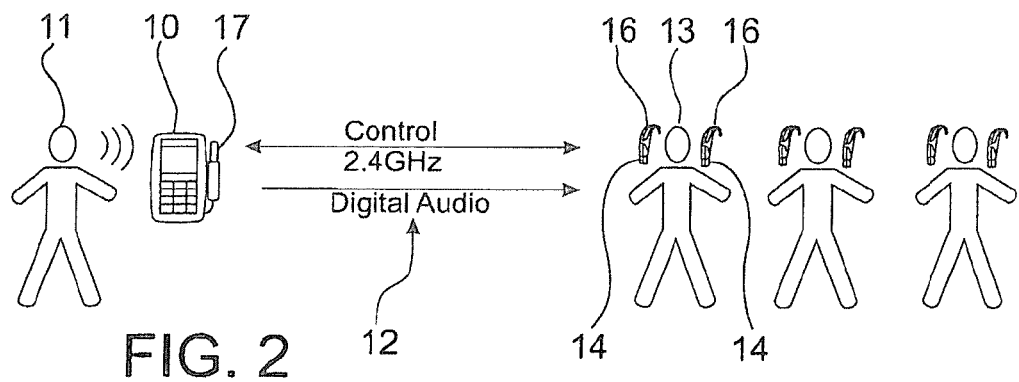
FIG. 2 is a schematic view of a use of a first example of a system according to the invention.

In FIG. 2, a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e., the same signals are sent to all receiver units 14.

Figure 3:
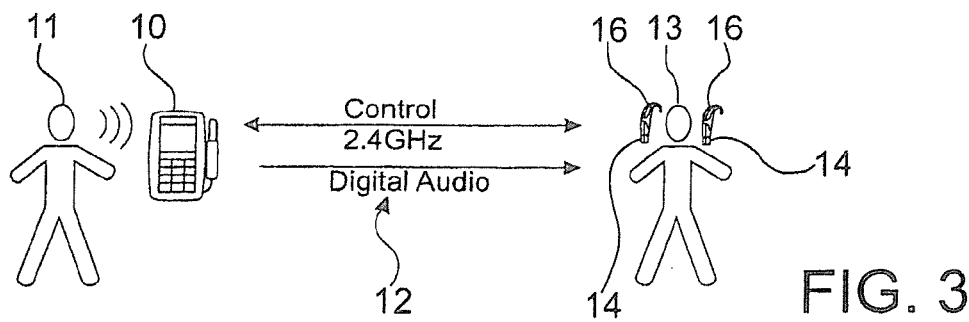
FIG. 3 is a schematic view of a use of a second example of a system according to the invention.

Another typical use case is shown in FIG. 3, wherein a transmission unit 10 having an integrated microphone is used by a hearing-impaired person 13 wearing receiver units 14 connected to or integrated within a hearing aid 16 for capturing the voice of a person 11 speaking to the person 13. The captured audio signals are transmitted via the digital link 12 to the receiver units 14.

Figure 4:
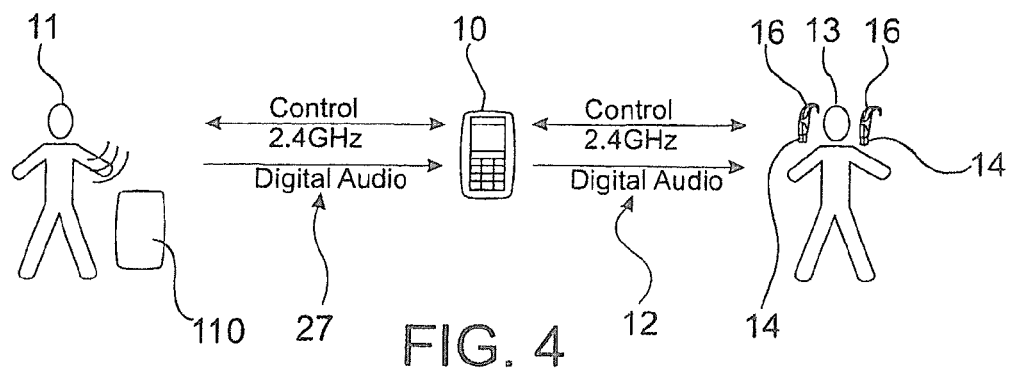
FIG. 4 is a schematic view of a use of a third example of a system according to the invention.

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

The transmission units 10, 110 may comprise an audio input for a connection to an audio device, such as a mobile phone, a FM radio, a music player, a telephone or a TV device, as an external audio signal source.

In each of such use cases, the transmission unit 10 usually comprises an audio signal processing unit (not shown in FIGS. 2 to 5) for processing the audio signals captured by the microphone prior to being transmitted.

Figure 5:
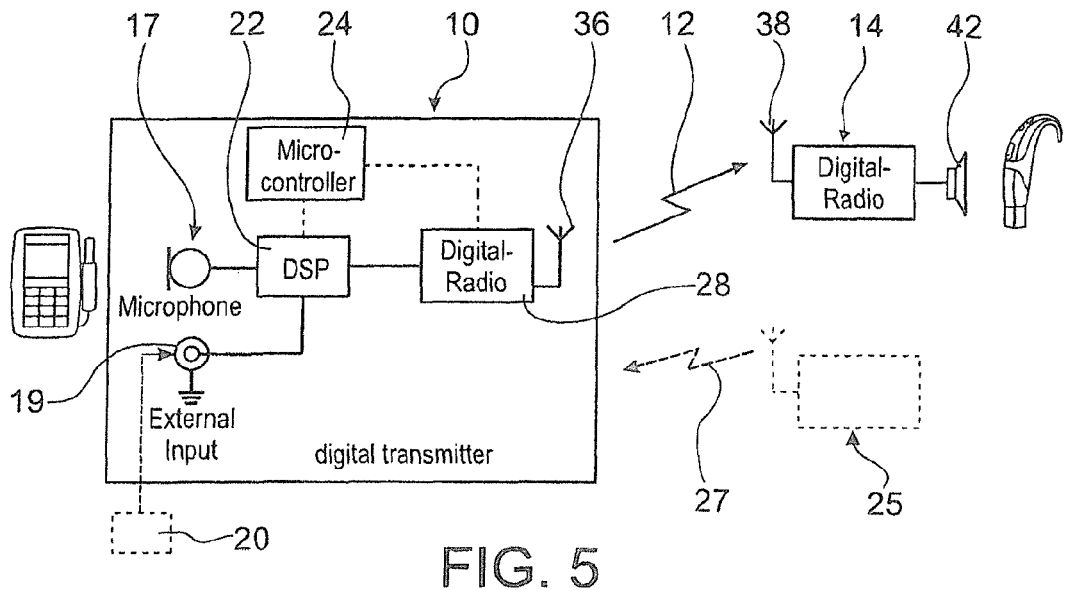
FIG. 5 is a schematic block diagram of an example of a system according to the invention.

A schematic block diagram of an example of a hearing assistance system according to the invention is shown in FIG. 5. The system comprises a transmission unit 10 and at least one digital receiver unit 14.

The transmission unit 10 comprises a microphone arrangement 17 for capturing a speaker's voice, which may be integrated within the housing of the transmission unit 10 or which may be connected to it via a cable. The transmission unit 10 also may include an audio signal input 19 which serves to connect an external audio signal source 20, such as a mobile phone, an FM radio, a music player, a telephone or a TV device, to the transmission unit 10.

The audio signals captured by the microphone arrangement 17 and/or the audio signals optionally received from the external audio signal source 20 are supplied to a digital signal processor (DSP) 22 which is controlled by a microcontroller 24 and which acts as an audio signal processing unit which applies, for example, a gain model to the captured audio signals.

In addition, the DSP 22 may serve to analyze the captured audio signals and to generate control data (control commands) according to the result of the analysis of the captured audio signals. The processed audio signals and the control data/commands are supplied to a digital transmitter 28, which is likewise controlled by the microcontroller 24.

The digital transmitter 28 transmits the modulated signals via an antenna 36 to an antenna 38 of the digital receiver unit 14, thereby establishing a digital link 12.

Both the digital transmitter 28 and the digital receiver unit 14 are designed as transceivers, so that the digital transceiver 28 can also receive control data and commands sent from the digital receiver unit 14.

The transceiver 28 also may be used for receiving audio signals from an external audio source 25, such as a remote microphone used as a companion microphone, via a wireless digital audio link 27, with the received audio signals being supplied to the DSP 22 for retransmission by the transceiver 28. Hence, in this case, the transmission unit 10 serves to relay audio signals from the external audio source to the receiver unit 14 (see examples of FIGS. 4 and 11). Alternatively, the transmission unit 10 may include a separate receiver (not shown in the FIGS. 6 and 7) for receiving the audio signals from the external audio source; in this case the link 27 would be independent from the link 12 and thus also could be analog.

The microcontroller 24 is responsible for management of all transmitter components and may implement the wireless communication protocol, in particular for the digital link 12.

The digital receiver unit 14 comprises or is connected to a loudspeaker 42 or another means for stimulating a user's hearing. Typically, the receiver unit 14 is an ear-worn device which is integrated into or connected to a hearing aid comprising the speaker 42. The control data transmitted in parallel to the audio signals may serve to control operation of the receiver unit 14 according to the presently prevailing auditory scene as detected by the DSP 22 from the audio signal captured by the microphone arrangement 17.

Figure 6:
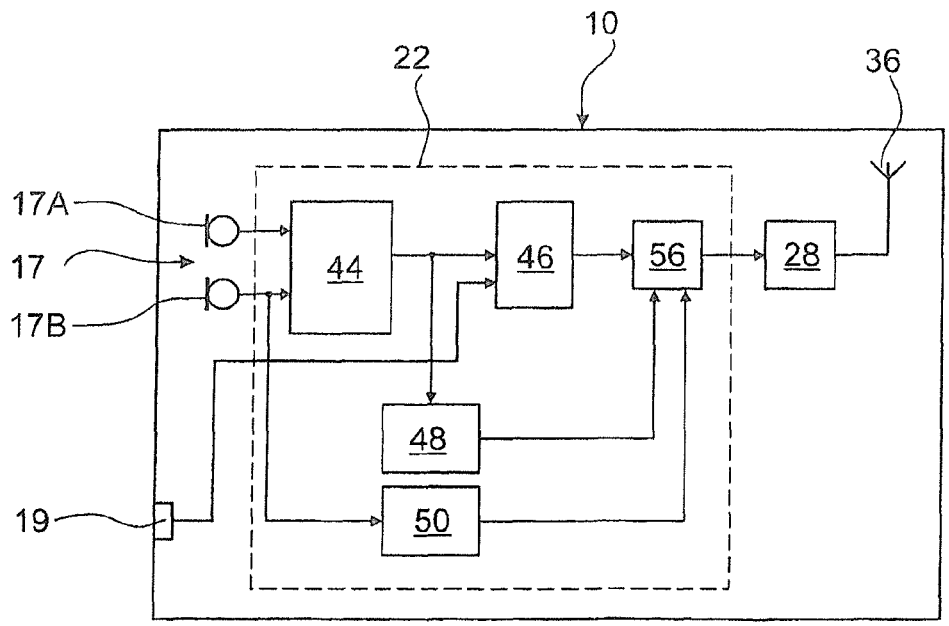
FIG. 6 is a more detailed example of the audio signal path in the transmission unit of the system of FIG. 5.

In FIG. 6, an example of the audio signal path in the transmission unit 10 is shown in more detail.

The microphone arrangement 17 of the transmission unit 10 comprises two spaced apart microphones 17A and 17B for capturing audio signals which are supplied to an acoustic beam-former unit 44 which generates an output signal supplied to a gain model unit 46. The output of the beam-former unit 44 is also supplied to a voice activity detector (VAD) unit 48 which serves to detect whether the speaker is presently speaking or not and which generates a corresponding status output signal. The output of at least one of the microphones 17A, 17B is also supplied to an ambient noise estimation unit 50 which serves to estimate the ambient noise level and which generates a corresponding output signal. The output signals of the units 48 and 50 and the processed audio signals from the gain model 46 are supplied to a unit 56 which serves to generate a corresponding digital signal comprising the audio signals and the control data which is supplied to the digital transceiver 28. The external audio signals optionally received via the audio input 19 and/or the transceiver 28 may be supplied to the gain model 46.

The units 44, 46, 48, 50 and 56 may be functionally realized by the DSP 22 (see dashed line surrounding these units in FIG. 6).

Figure 7:
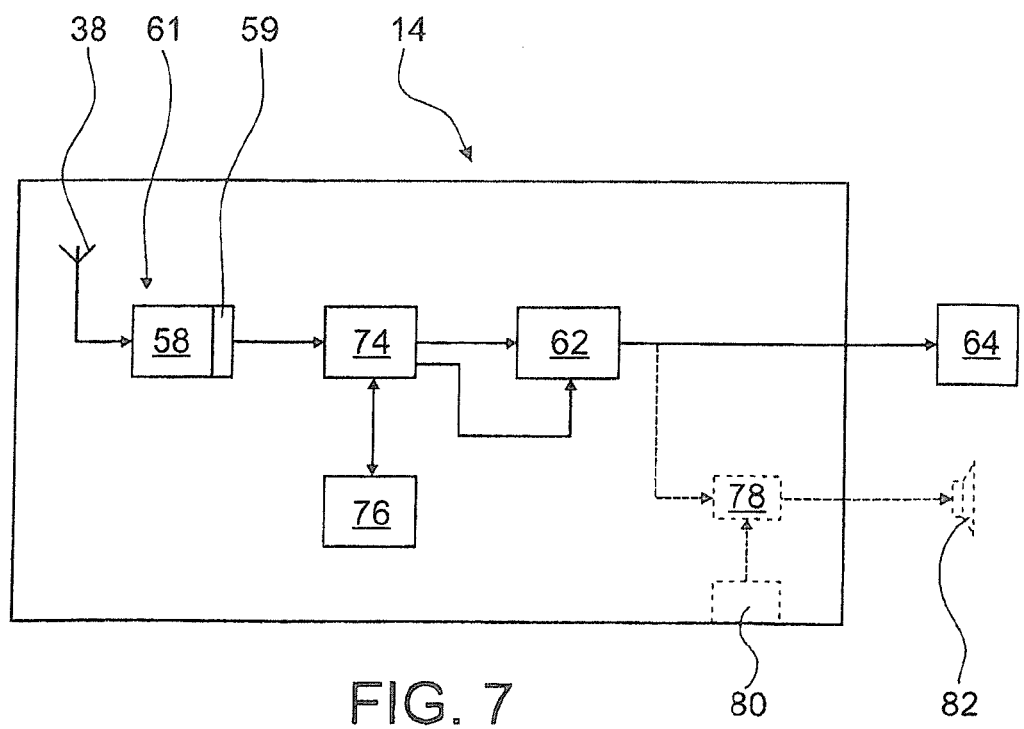
FIG. 7 is a more detailed block diagram of an example of the receiver unit of the system of FIG. 5.

A more detailed example of the digital receiver unit 14 is shown in FIG. 7, according to which the antenna 38 is connected to a digital receiver 61 including a demodulator 58 and a buffer 59 (actually, the element 61 is designed as a transceiver).

The signals transmitted via the digital link 12 are received by the antenna 38 and are demodulated in the digital radio receiver 61. The demodulated signals are supplied via the buffer 59 to a DSP 74 acting as processing unit which separates the signals into the audio signals and the control data and which is provided for advanced processing, e.g., equalization, of the audio signals according to the information provided by the control data. The processed audio signals, after digital-to-analog conversion, are supplied to a variable gain amplifier 62 which serves to amplify the audio signals by applying a gain controlled by the control data received via the digital link 12. The amplified audio signals are supplied to a hearing aid 64. Alternatively, the variable gain amplifier may be realized in the digital domain by using a PWM modulator taking over the role of the D/A-converter and the power amplifier. The receiver unit 14 also includes a memory 76 for the DSP 74.

Rather than supplying the audio signals amplified by the variable gain amplifier 62 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be obtained remotely from the transmission unit 10 by transmitting corresponding control commands to the receiver unit 14.

In general, the role of the microcontroller 24 could also be taken over by the DSP 22. Also, signal transmission could be limited to a pure audio signal, without adding control and command data.

Figure 8:
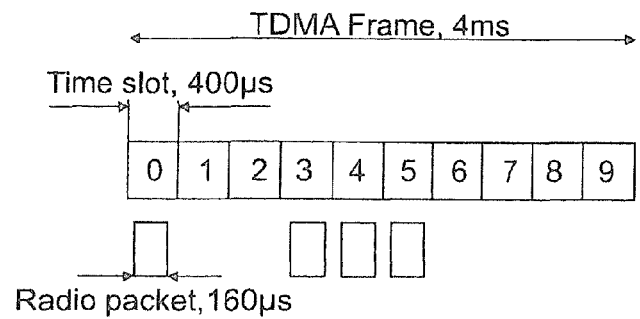
FIG. 8 is an example of the TDMA frame structure of the signals of the digital audio link used in a system according to the invention.

Details of the protocol of the digital link 12 will be described by reference to FIGS. 8, 9 and 10. Typical carrier frequencies for the digital link 12 are 865 MHz, 915 MHz and 2.45 GHz, wherein the latter band is preferred. Examples of the digital modulation scheme are Phase-shift keying (PSK)/Frequency-shift keying (FSK), Amplitude-Shift Keying (ASK) or combined amplitude and phase modulations such as Quadrature Phase Shift Keying (QPSK), and variations thereof (for example, Gaussian Frequency-Shift Keying (GFSK)).

Preferably, data transmission occurs in the form of TDMA (Time Division Multiple Access) frames comprising a plurality (for example, 10) of time slots, wherein one data packet may be transmitted in each slot. In FIG. 8, an example is shown wherein the TDMA frame has a length of 4 ms and is divided into 10 time slots of 400 µs, with each data packet having a length of 160 µs.

A slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), the ID of the network master device (usually one of the transmission units 10) and the frequency of the last slot of the previous frame.

The first slot of each TDMA frame (beacon=slot 0 in FIG. 8) is allocated to the periodic transmission of a beacon packet which contains the sequence number numbering, the TDMA frame and other data necessary for synchronizing the network, such as information relevant for the audio stream, such as description of the encoding format, description of the audio content, gain parameter, surrounding noise level, etc., information relevant for multi-talker network operation, and optionally, control data for all or a specific one of the receiver units.

The second slot (slot 1 in FIG. 8) may be allocated to the reception of response data from slave devices (usually the receiver units) of the network, whereby the slave devices can respond to requests from the master device through the beacon packet. At least some of the other slots are allocated to the transmission of audio data packets, wherein each audio data packet is repeated at least once, typically in subsequent slots. In the example shown in FIG. 9 slots 3, 4 and 5 are used for three-fold transmission of a single audio data packet. The master device does not expect any acknowledgement from the slaves devices (receiver units), i.e., repetition of the audio data packets is done in any case, irrespective of whether the receiver unit has correctly received the first audio data packet (which, in the example of FIG. 9, is transmitted in slot 3) or not. Also, the receiver units are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot, for example, slot 0.

The audio data maybe compressed in the transmission unit 10 prior to being transmitted.

Figure 10:
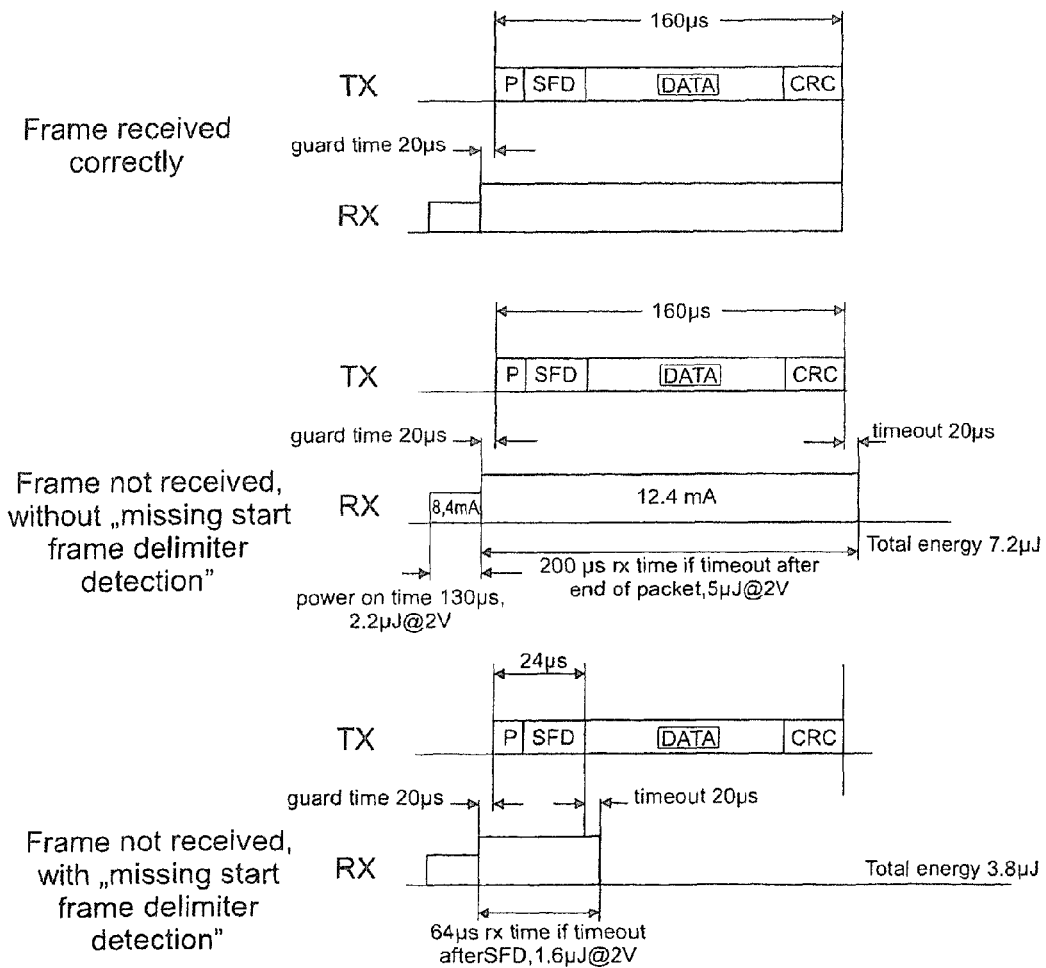
FIG. 10 is an illustration of an example of how a receiver unit in a system according to the invention listens to the signals transmitted via the digital audio link.

Each audio data packet comprises a start frame delimiter (SFD), audio data and a frame check sequence, such as CRC (Cyclic Redundancy Check) bits (see FIG. 10).

In order to save power, the receiver 61 in the receiver unit 14 is operated in a duty cycling mode, wherein each receiver wakes up shortly before the expected arrival of an audio packet. If the receiver is able to verify (by using the CRC at the end of the data packet) that the data packet has been received correctly, then the receiver goes to sleep until shortly before the expected arrival of a new audio data packet (the receiver sleeps during the repetitions of the same audio data packet), which, in the example of FIG. 9, would be the first audio data packet in the next frame. If the receiver determines, by using the CRC, that the audio data packet has not been correctly received, the receiver switches to the next frequency in the hopping sequence and waits for the repetition of the same audio data packet (in the example of FIG. 9, the receiver then would listen to slot 4 as shown in FIG. 9, wherein in the third frame transmission of the packet in slot 3 fails).

In order to further reduce power consumption of the receiver, the receiver goes to sleep already shortly after the expected end of the SFD, if the receiver determines, from the missing SFD, that the packet is missing or has been lost; see FIG. 10. The receiver then will wake up again shortly before the expected arrival of the next audio data packet (i.e., the copy/repetition of the missing packet).

Figure 9:
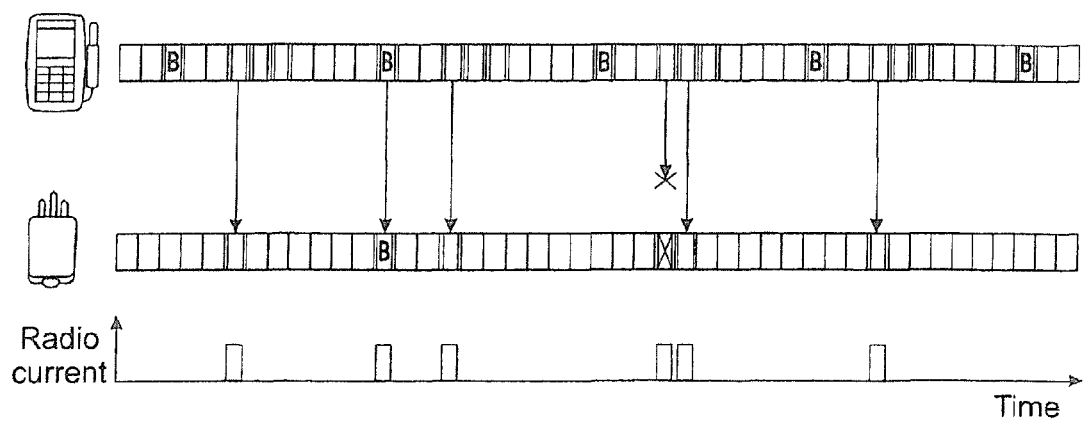
FIG. 9 is an illustration of an example of the protocol of the digital audio link used in a system according to the invention in the connected state.

FIG. 9 shows a typical behavior of a receiver unit 14. In the first frame, the transceiver 61 correctly receives the first transmission, so that only one current pulse is taken from the power supply during the $1^{st}$ frame. At the beginning of the second frame, the transceiver 61 switches ON for receiving also the beacon (as already mentioned above, the beacon is a service data packet that is transmitted in the first slot of each frame for synchronisation of different receivers). The receiver unit does not need to receive each beacon, it needs only to receive it from time to time (typically 1 beacon every $25^{th}$ frame). The reception of a beacon adds one current pulse every $x^{th}$ (here: every $25^{th}$) frame. In the example of FIG. 9, the first transmission is received correctly. In total, 2 current pulses are consumed during this $2^{nd}$ frame. In the $3^{rd}$ frame, the transceiver 61 switches ON for receiving the first packet but it receives it with errors (first current pulse). Then, it switches ON again for receiving the second transmission and receives it correctly ($2^{nd}$ current pulse in the same frame, i.e., total 2 current pulses in the $3^{rd}$ frame). In the $4^{th}$ frame, transceiver 61 switches ON for receiving the first packet; the packet is correctly received (i.e., only one current pulse is consumed during the $4^{th}$ frame). If the transmission path is good, the normal working regime is to receive one packet per frame, i.e., only one current pulse is taken during each frame.

An example of duty cycling operation of the receiver is shown in FIG. 10, wherein the duration of each data packet is 160 µs and wherein the guard time (i.e., the time period by which the receiver wakes up earlier than the expected arrival time of the audio packet) is 20 µs and the timeout period (i.e., the time period for which the receiver waits after the expected end of transmission of the SFD and CRC, respectively) likewise is 20 µs. It can be seen from FIG. 10 that, by sending the receiver to sleep already after timeout of SFD-transmission (when no SFD has been received), the power consumption can be reduced to about half of the value when the receiver is sent to sleep after timeout of CRC transmission.

Typically, a radio receiver boot is connected to the hearing instrument by a 3-pin interface comprising a pin assigned to the analog audio input of the hearing instrument for external audio signals, a pin assigned to the positive contact of the hearing instrument battery and a pin assigned to the negative contact of the hearing instrument battery, wherein the negative contact of the hearing instrument battery also serves as the ground return path for the audio signal, so that in fact the power line and the audio signal line share a common ground line.

Serial parasitic resistances between the two devices occur due to the contacts between the hearing instrument and its audio shoe on one side and through contacts between the audio shoe and the radio receiver unit on the other side. The contact resistance in serial with the ground connection causes a problem, since this line is the ground line for the analog audio signal, and at the same time, also carries the supply current pulses. If, for example, the ground contact resistance is assumed to be 100 m'Ω, a current pulse of 25 mA produces a voltage pulse in serial with the ground line which amounts to 2.5 mV. This level is close to that of the audio signals delivered by the receiver unit to the hearing instrument, which is typically from 1 to 10 mV. Assuming that the transceiver is switched on and off at least once in each 4 milliseconds TDMA frame for listening to one audio data packet, a 250 Hz signal of 2.5 mV amplitude would be produced by the switching of the transceiver.

A similar, although less severe, problem occurs also if the receiver unit is integrated within the hearing instrument rather being connected to it by a 3-pin connector. The reason is that in this case a noise signal might be generated in the earphone of the hearing aid by the transceiver current changes due to the internal resistance of the hearing instrument battery.

In FIGS. 11 to 19, examples are shown of how such noise signals due to transceiver current ripples can be avoided.

Figure 11:
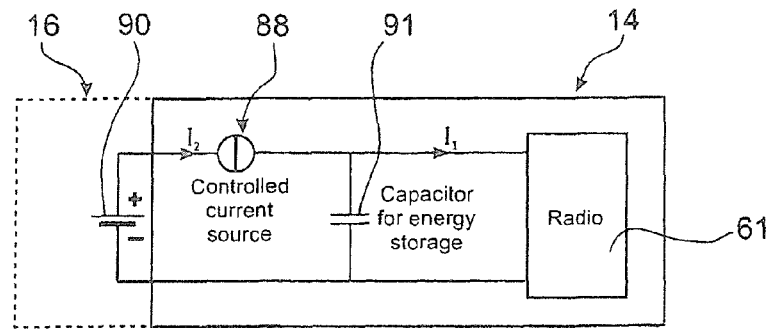
FIG. 11 is a schematic block diagram of an example of a receiver unit according to the invention including a controlled current source.

In FIG. 11, a schematic block diagram of a receiver unit 14 connected to hearing aid 16 is shown, wherein a controlled current source 88 is connected in series between the battery 90 of the hearing aid 16 and the digital transceiver 61 of the receiver unit 14, with a capacitor 91 being connected in parallel to the transceiver 61. The capacitor 91 is provided for supplying the transceiver 61 during listening or transmission operation with current and for being recharged by the hearing aid battery 90 when the transceiver 61 is sleeping (typically, the transceiver 61 listens only during less than 10% of each frame). FIG. 12 shows an embodiment of system of FIG. 11, where the current source 88 is placed after a voltage multiplier 93 in the receiver unit 14. The controlled current source 88 includes a control unit 92 for controlling the current $I_2$ flowing from the battery 90 to the transceiver 61 and the capacitor 91 in a manner so as to prevent changes in the current $I_2$ caused by the transceiver 61 switching between sleeping and listening/transmission operation and vice versa, respectively, which are expected to add an audible nose signal to the audio signals supplied to the hearing aid 16 for being reproduced by the stimulation means/loudspeaker 42 of the hearing aid 16.

The controlled current source 88 preferably adjusts the current $I_2$ to a constant target current value selected according to the estimated quality of the digital audio link 12 (usually, the quality of the digital audio link 12 is a measure for the expected average current consumption of the transceiver 61, since a low link quality requires the transceiver to listen more frequently to repetitions of packets). The target current value corresponds to the estimated average current to be consumed by the transceiver 61 plus a safety overhead of −0% . . . +20% to account for transient, i.e., short-teem, changes in link quality. The excess of current is derived to GND by the shunt circuit 96, which prevents the radio supply voltage $V_{RADIO}$ from exceeding a maximum value, and/or the voltage across the current source $I_2$ from falling below a minimum value $V_{SAT}$. Preferably, the controlled current source 88 and the capacitor 91 are designed to keep the current ($I_2$) flowing from the power source 90 to the transceiver 61 within ±0.1% at the target value.

Figure 13:
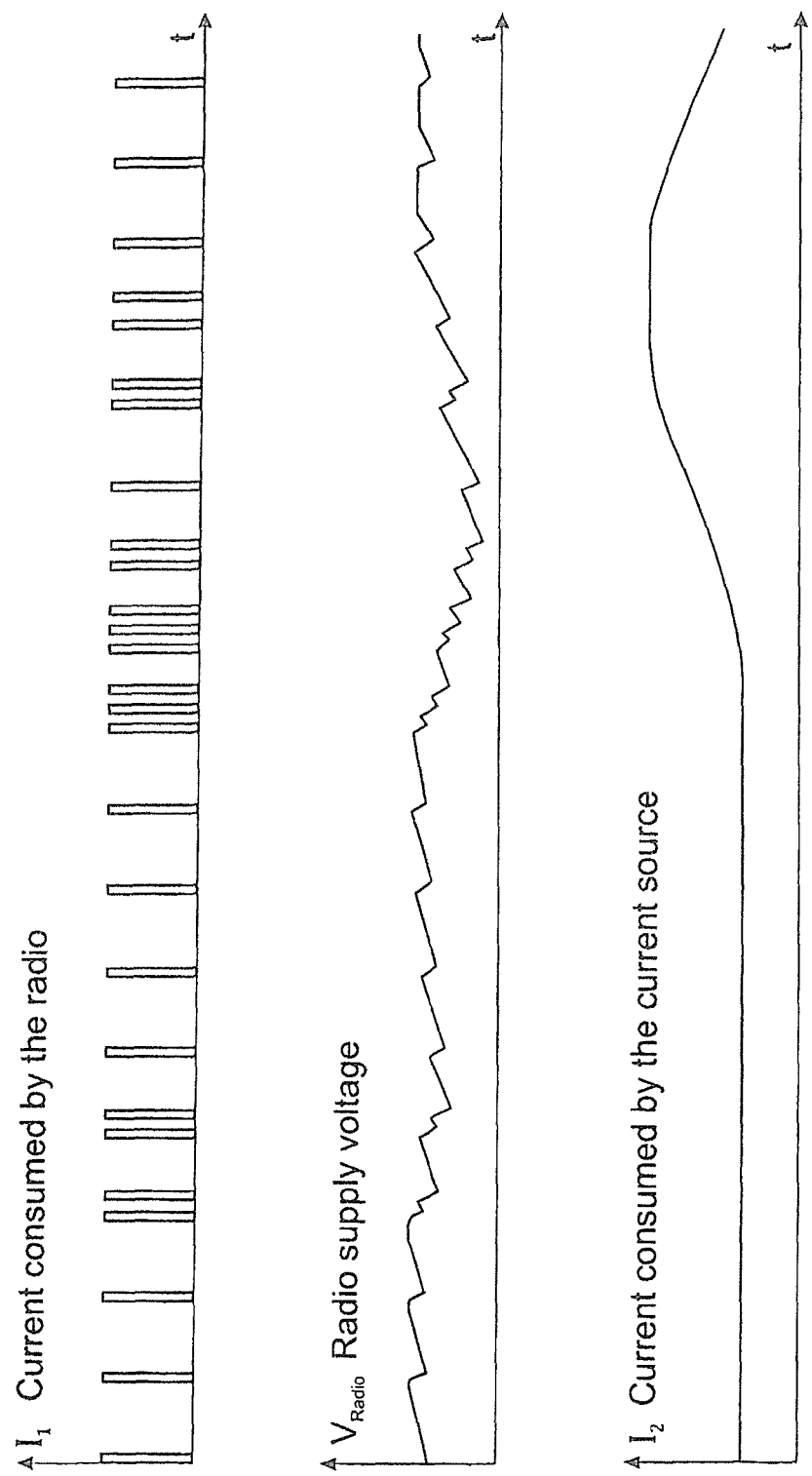
FIG. 13 are plots, from top to bottom, of the current consumed by a transceiver of the receiver unit of FIGS. 11 and 12, the transceiver supply voltage and the current consumed by the current controlled source, respectively, as a function of time.

As illustrated in the top and bottom diagrams of FIG. 13, degrading link quality causes a higher average current $I_1$ consumed by the transceiver 61, since, when the link quality is reduced, the likelihood that the transceiver 61 has to listen to the first or second repetition of a certain audio data packet is higher. If the link quality degrades during a short time period (for example, caused by interference from other systems on specific frequencies), the current $I_2$ can be kept constant, as the current overhead is sufficient to inflate again the voltage $V_{RADIO}$ over the capacitor once the interference has ceased. However, if the link quality degrades so much that the transceiver 61 has to listen almost in every frame to the second transmission of each audio data packet, the average current will double with regard to a good link quality which does not require reception of repetitions of the audio data packet. Correspondingly, also the current drawn from the hearing aid battery 90 has to be doubled. However, if such current increase would occur very fast, such current increase may cause voltage ripples in the audible frequency range, which might be perceived by the user of the hearing aid 16. Therefore, the control unit 92 adjusts the current $I_2$ to be supplied by the current source 88 with a time constant of at least 0.05 seconds. This example is illustrated in FIG. 13, wherein the current $I_2$ is increased relatively slowly from the lower value corresponding to good link quality to the second value corresponding to bad link quality. Then, if the link quality improves again, the system has to listen to less packets and the radio supply voltage $V_{RADIO}$ rises again. The loading current can be reduced again by the controller, but this time a relatively long time constant of typically 0.5-1 seconds can be used. Due to such relatively long time constant, some current may be "wasted" for a while if the link quality remains constant, but, on the other hand, the current must not be increased again if the link degrades again soon.

However, if there is a sudden and severe degradation of link quality that forces reception of 2-3 transmissions at each frame for a long time, the system may enter an emergency procedure, raising the current faster, i.e., with a shorter time constant than 0.05 s, although this may cause audible ripples. In such case, the audio output of the receiver unit may be interrupted during the time of current increase, and it may be connected again once the current is stable again. Such emergency situations may be avoided, to some extent, by using the above-mentioned relatively long current release time constants of 0.5-1 seconds. Preferably, the control unit 92 estimates the link quality from an output signal of the transceiver 61, which is indicative of the packet level error rate, i.e., how frequently the transceiver 61 has to listen to packet repetitions, and/or the bit level error rate of the received audio signals.

Since the current $I_2$ includes a certain safety overhead and since the control unit 92 is informed by the transceiver 61 regarding the link quality in real time, the control unit 92 will be able to adjust the target value of the current $I_2$ early enough and with a sufficiently long time constant in a manner that the charging state of the capacitor 91 is always sufficient for supplying the transceiver 61 with the required current, while avoiding the need for fast changes of the current $I_2$.

The current control by the control unit 92 also serves to monitor the supply voltage $V_{RADIO}$ of the transceiver 61 in a manner so as to keep $V_{RADIO}$ in a safe range. In order to generate a sufficiently high supply voltage, the voltage of the hearing aid battery 90 is increased sufficiently by a voltage multiplier 93 provided in the receiver unit 14. The voltage multiplier 93 provides for an output voltage $V_M$. The maximum allowable value of $V_{RADIO}$ is given by the output voltage $V_M$ of the voltage multiplier 93 minus the minimum voltage $V_{SAT}$ across the current source 88 required for proper operation (if the current source 88 is realized, for example, by a MOS transistor operating in moderate inversion, the minimum value $V_{SAT}$ would be between about 100 and 200 mV). The lower limit of the allowable range of $V_{RADIO}$ is given by the minimum voltage at the transceiver 61 necessary for operating correctly.

In order to prevent $V_{RADIO}$ from exceeding the allowed maximum value, the shunt regulator 96 may cause dummy discharge of the capacitor 91. This may be realized by the shunt regulator 96 alone that monitors the voltage $V_{RADIO}$ and automatically derivates the excess of current delivered by the current source 88 to GND, thus maintaining $V_{RADIO}$ below a maximum value. This may also be realized, for example, by a load resistor connected in parallel to the capacitor 91, which is periodically switched on by the control unit 92 to provide for the necessary discharge of the capacitor 91. Alternatively or in addition, the control unit 92 may force the transceiver 61 to periodically carry out dummy listening operation in order to provide for a necessary (additional) discharge of the capacitor 91.

The middle diagram of FIG. 13 illustrates an example of the control of the transceiver supply voltage If there are small disturbances during a short time, more than one reception of packets in a frame is needed and the transceiver supply voltage $V_{RADIO}$ decreases a bit, but it stays above a safety margin. Once the disturbance has ceased, the voltage can rise again up to its maximum value using the current overhead, and it is not necessary to change the value of the current source $I_2$. If the disturbance is more severe, the system will first wait until $V_{RADIO}$ falls below a first security threshold and/or count for the number of receptions required by the transceiver. If the degradation is confirmed, the system will start raising the value of $I_2$ with a slow time constant in the order of 0.05-0.1 s, as already mentioned above. During this reaction time, $V_{RADIO}$ can still decrease.

If the supply voltage falls below a safety threshold value ($V_{RADIO} \leq V_{RADIO\_MIN}$) then the system, as already mentioned above, will react fast in an emergency procedure, which may cause the current ripple to become audible (the system may at this time temporarily break the audio path, and connect it again once the current I$_2$ is stable again). The release time of current typically is longer than the attack time, in the order of 0.5-1 s. If the link becomes good again, the excess current will be derived to GND by the shunt regulator during this time.

In the example of FIG. 12, the receiver unit 14 is connected to the hearing aid 16 via an audio interface 89, usually an audio shoe, comprising a pin 89C connected to the positive electrode of the hearing aid battery 90, a pin 89A connected to the negative electrode of the hearing aid battery 90, and a pin 89B connected to the external audio input of the hearing aid 16, wherein the pin 89A also serves as a ground pin for the audio signal input. The hearing aid 16 includes, as shown in FIG. 12, a speaker (earphone) 42, a microphone arrangement 94 and a signal processor 95 for processing the audio signals captured by the microphone arrangement 94 and the audio signals supplied by the receiver unit 14 via the audio input.

In the example of FIG. 12, the voltage multiplier 93 and the current source 88 are separate blocks. A drawback is the voltage drop that is needed for proper operation of the current source $V_M - V_{RADIO} \geq V_{SAT} = 100 \ldots 200$ mV This drawback can be overcome by combining both voltage multiplier 93 and current source 88 into a single block, for example by realizing the voltage multiplier in a special form of a boost DC/DC converter using a coil and working in discontinuous mode.

In this regard, a step-up DC/DC converter is needed that delivers an output voltage having a value set between a lower and an upper limit. The DC/DC converter should have the characteristic of a current source at its input, so that a change in output voltage over the capacitor 91 will not produce a change in the current consumed by the DC/DC converter from the battery 90.

The DC/DC converter may be realized as a "bridged boost converter" using 4 switches. The sequence of operation of the switches, as illustrated in FIG. 15, insures a constant current flowing out of the battery 90. According to FIG. 14 the bridged boost converter 95 is connected in serial with the battery 90 and the digital transceiver 61, with a capacitor 91 being connected in parallel to the transceiver 61. The capacitor 91 is provided for supplying the transceiver 61 during listening or transmission operation with current and for being recharged by the battery 90 when the transceiver 61 is sleeping, as discussed already in connection with FIG. 12. Usually, the capacitor 91 is connected in parallel to the transceiver 61 through specific contact pads 91A and 91B.

The bridged boost converter 95 has 4 MOS transistors M1, M2, M3 and M4 that act as switches, a coil 96 connected to the switches through specific contacts 96A and 96B, a control block 97 and 4 diodes D1, D2, D3 and D4. The diodes D1, D2, D3 and D4 are the drain substrate diodes of MOS transistors M1, M2, M3 and M4 respectively.

The control block 97 provides appropriate voltage levels for switching ON or OFF the MOS M1, M2, M3 and M4 at the right time; for achieving this task, the control block 97 monitors the battery voltage $V_{BAT}$, the output voltage $V_{RADIO}$ and the voltage level at contact 96B (Voltage at node B).

The converter 95 operates over a defined number of working cycles per second. The current I$_2$ that is delivered to the radio 61 and the capacitor 91 as well as the current I$_{BAT}$ taken from the battery are proportional to the number of cycles. The number of working cycles per second that is needed for proper operation is defined by the control block 97 as a function of the output voltage $V_{RADIO}$ and of the battery voltage $V_{BAT}$.

In FIG. 15, the different phases of a working cycle are illustrated. Before the cycle starts, all switches M1, M2, M3 and M4 are open and the current through the coil 96 equals zero.

Phase 1: At start (time t=0) switches M2 and M3 are closed and M1 and M4 remain open. In this way, the current flowing through the coil 96 (L) increases linearly with time.

Phase 2: At time t=T1, switches M2 and M3 open. This will not stop the current flowing through the coil 96, as a coil opposes naturally to current variations; the coil will drive the voltage at node A below that of GND node and will also drive the voltage at node B over the voltage of output node (Node VH=$V_{RADIO}$). Diodes D1 and D4 become then conductive and the current flows now through the coil 96, the diodes D1 and D4, the reference node GND and the output node 91A through the capacitor 91; this current charges the output capacitor 91.

Phase 3: At time T2, switches M1 and M4 close, providing a short circuit of diodes D1 and D4. This improves the transfer of the energy that was stored into the coil 96 during the phase 1 to the capacitor 91, as there exists no longer the voltage drop over the diodes D1 and D4. The time duration of precedent phase 2, $T_2 - T_1 = \Delta T_{OVL}$ is called "non overlap time". It is needed for insuring that switch M2 opens before switch M1 closes and also that switch M3 opens before switch M4 closes; this prevents the direct conduction path through M1-M2 or M3-M4, respectively. For saving energy, the "non overlap time" T2-T1 has to be kept as low as possible. During time interval T3-T2, the current flowing through the coil 96 decreases, charging the output capacitor 91.

Phase 4: At time T3, the control block 97 opens again the switch M4. Time T3 is chosen by the control block 97 as a point in time before the current through the coil 96 reverses sense. The control block monitors the voltages at nodes 96B (Node B) and 91A (Node VH) for deciding the right moment to switch M4 OFF. During phase 4, the residual current through the coil 96 continues flowing through the reference node GND, the switch M1 and the diode D4 to the output node 91A, delivering its residual energy to the output capacitor 91. At time T4, the current through the coil reaches zero. The diode D4 ceases conduction and the voltage at node B goes back to GND level.

Phase 5: At time $T_4' > T_4$ the control block 97 opens the switch M1 again. Until end of this phase (guard time), all switches are open and the current through the coil is zero. At time T5, the converter is ready for starting a new working phase.

The converter 95 operates in discontinuous mode, wherein at the beginning and at the end of each cycle the current through the coil 96 is zero.

The time duration until T1 is the "charging time", during which the coil 96 stores energy. This time period is made independent of the value of output voltage at node 91A ($V_{RADIO}$) by the control block 97. In this way, the average current I$_{BAT}$ that is consumed by the converter 95 on the battery is made independent of the value of output voltage $V_{RADIO}$.

The control block 97 will adjust the number of working cycles per second for maintaining the output voltage $V_{RADIO}$ between the two voltage thresholds $V_{RADIO\_MIN} \leq V_{RADIO} \leq V_{RADIO\_MAX}$ with slow time constants. In this way, the average current consumed from the battery will also vary with a slow time constant, preventing the current changes through the battery from being audible.

Figure 19:
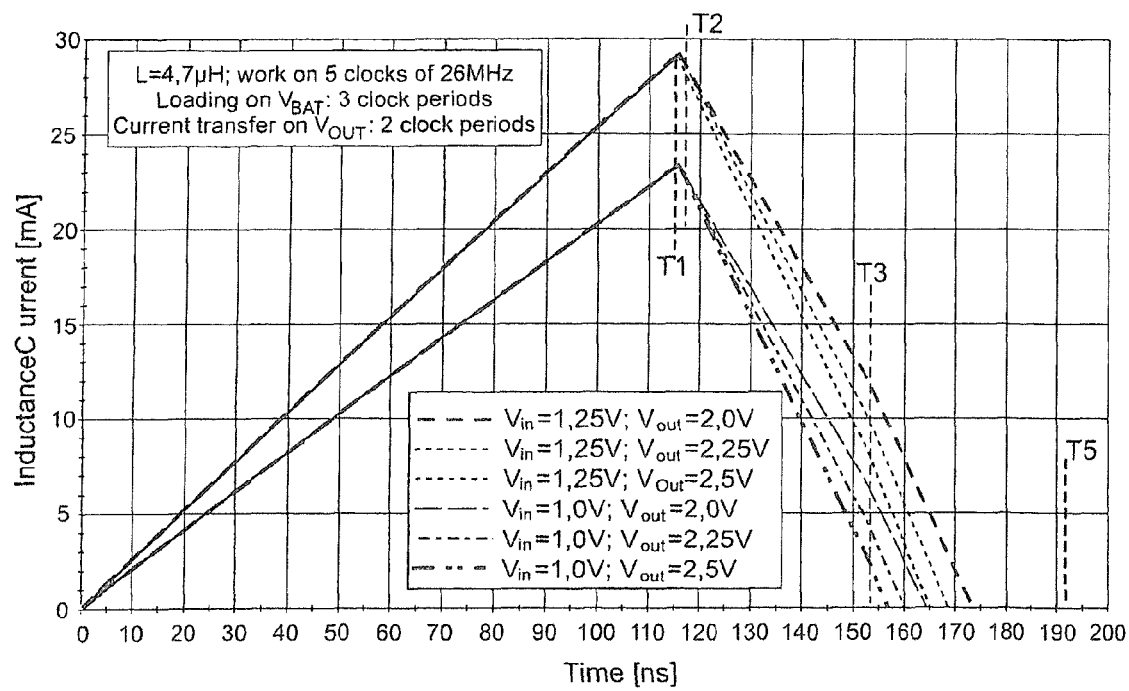
FIG. 19 are plots of examples of current profiles through the coil during a working period for various input and output voltages.

In a practical example, a working period of the converter 95 uses 5 periods of a clock generated by a quartz oscillator at a 26 MHz frequency. The duration of the charging time T1 (phase 1) is 3 periods of the quartz frequency (115 ns), the non-overlap time T2−T1 (phase 2) is preferably less than 2 ns, the time duration of phase 3 is typically one period of the quartz frequency (38.5 ns), and duration of phases 4 and 5 together is also one period of the quartz frequency or less. The coil has value L=4.7 µH, the battery voltage is between $V_{BAT}$=1.0V ... 1.5V and the output voltage is between 1.8V≤$V_{RADIO}$≤2.4V. The average current taken by the radio is $\bar{I}_1$=0.9 mA ... 2 mA FIG. 19 shows an example of current profile through the coil 96 during one working cycle for various combinations of the battery voltage and the output voltage. It can be seen that during the phase 1 of the cycle the current does not depend on the output voltage. As already mentioned, the control block 97 will adjust the number of working periods per second (duty-cycle of operation) as to maintain the output voltage between two defined limits $V_{RADIO\_MIN}$≤$V_{RADIO}$≤$V_{RADIO\_MAX}$. This duty-cycle (DC) is to be changed in small step increments. For example, the maximum size of increment in battery current for making the change inaudible should be Δ$I_1$=≤5 µA. Also, the fundamental frequency of duty-cycle should be above the audio frequency range, the upper limit of which is about 16 kHz. These are contradictory requirements.

For achieving small current increments without adding noise at audible frequencies the control of duty-cycle may be implemented through a fractional N-divider realized with a multi-modulus divider driven by a Δ/Σ modulator (such method is used in PLL frequency synthesizers for producing arbitrary small frequency step increments in short settling times).

Figure 18:
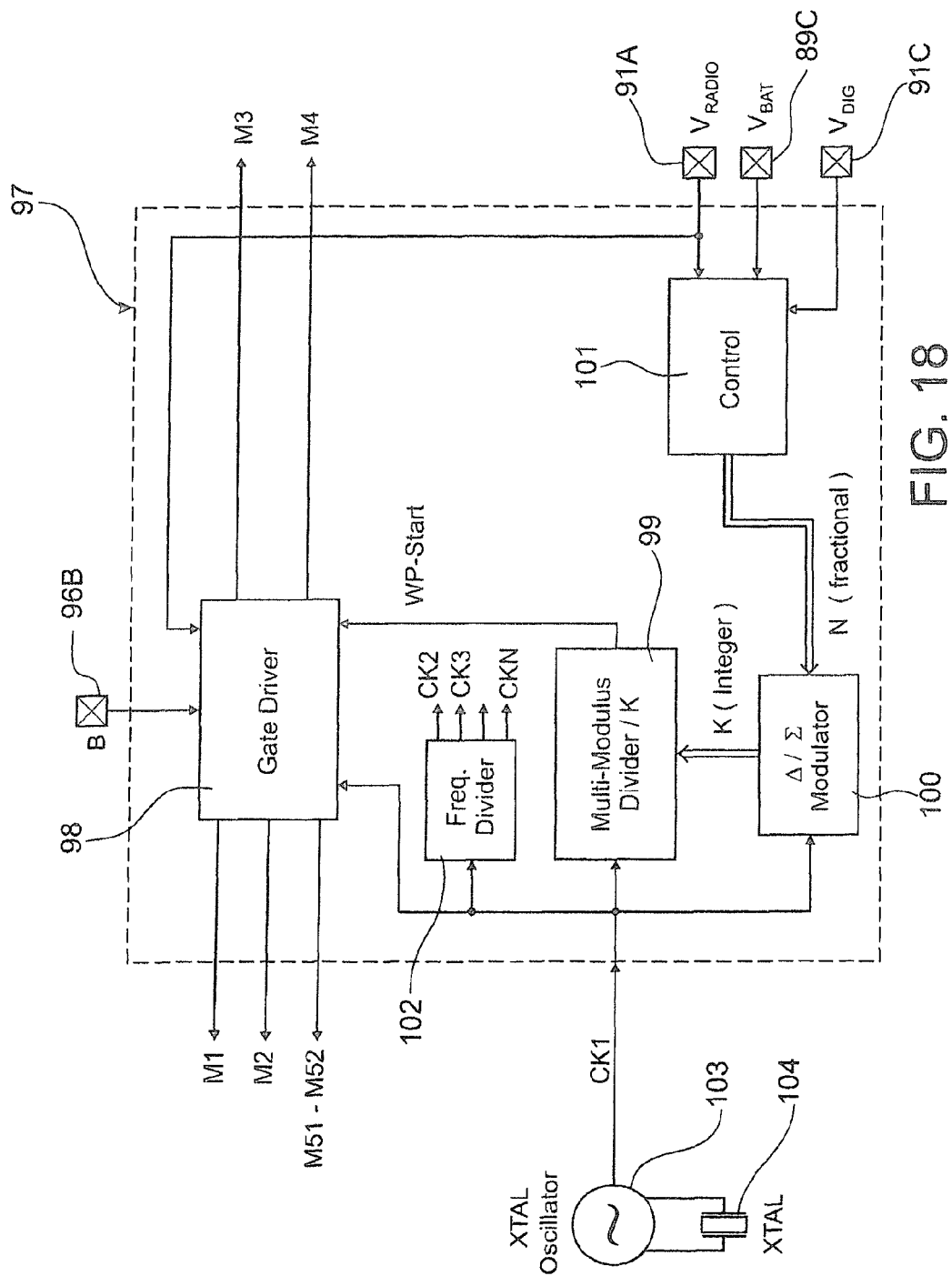
FIG. 18 is a block diagram of a controller to be used in the receiver units of FIGS. 14 & 16.

A block diagram of such an implementation of the control block 97 is shown in FIG. 18. The control block 97 comprises a gate driver 98, a multi-modulus divider 99, a Δ/Σ modulator 100, a control unit 101 and a frequency divider 102.

The gate driver 98 generates the control voltages for MOS transistors M1, M2, M3, M4 and M51-M52 at proper levels; it has as inputs the clock signals CK1 ... CKN, a command signal "WP-Start" and the voltages at nodes 96B (internal node B of converter 95) and 91A ($V_{RADIO}$). The input signal "WP-Start" initiates the start for a working cycle of the gate driver 98. The frequency divider 102 generates clocks (CK2 ... CKN) at various frequencies, lower than the clock signal CK1 of XTAL oscillator 103; these clocks are used by all other units 98, 99, 100 and 101 of the control block 97.

The multi-modulus divider 99 delivers the start signal for the gate driver 98. The start signal "WP-Start" is generated from clock signals CK1 ... CKN, by frequency division by an integer number K: $f_{WP\_START}$=$f_{CK1}$/K. The number K is variable in time. It is limited between the values $K_{MIN}$≤K≤$K_{MAX}$ that are the minimum and maximum division factor of the multi-modulus divider 99.

The Δ/Σ modulator 100 determines the division factor K of the multi-modulus divider 99, and it varies the division number in order to get the average value of K over time equal to the fractional number N: $\bar{K}$=N. The fractional number N is delivered to the Δ/Σ modulator 100 by the control unit 101 that adjusts N in order to get the voltage at node 91A in the allowable range: $V_{RADIO\_MIN}$≤$V_{RADIO}$≤$V_{RADIO\_MAX}$. The duty-cycle of the converter 95 is proportional to the frequency of the signal "WP-Start" (f $_{WP\_START}$), which is inversely proportional to the fractional division number N. Thus, the input and the output currents of converter are both inversely proportional to N.

The control block 97 needs a clock frequency that is independent of the battery voltage and the output voltages. In the present example, this clock frequency (CK1) is delivered by a quartz oscillator 103 connected to a quartz XTAL 104. The output frequency $f_{CK1}$=$f_{XTAL}$ of XTAL oscillator 103 drives the gate driver 98, the frequency divider 102, the multi-modulus divider 99 and the Δ/Σ modulator 100.

In a typical application, assuming a coil inductance L=4.7 µH, a battery voltage $V_{BAT}$=1.25V, an output voltage is $V_{RADIO}$=2.0V, an average current taken by the radio of $\bar{I}_1$=1.0 mA, an efficiency of the boost converter 95 of η=85% and a gate driver operating over 5 cycles of the XTAL clock frequency $f_{CK1}$=$f_{XTAL}$=26 MHz (with the duration of phase 1 being 3 periods of clock CK1, the duration of phase 3 being one period of CK1 and the duration of phases 4 and 5 together being 1 period of CK1), the working duty cycle of the converter 95 needs to be only DC=21.1%. The average division number is then:

$$\bar{K} = N = \frac{f_{CK1}}{f_{WP\_START}} = 23.7.$$

According to an alternative embodiment of the invention, the supply of digital circuits and of analog/RF circuits of the receiver unit 14 is combined within a single block.

The receiver unit 14 has digital and analog/RF circuits. The analog/RF circuits need a higher supply voltage than the battery ($V_{RADIO}$>$V_{BAT}$), but the digital circuits may be supplied at a lower voltage for saving power. With state of the art technologies, the digital circuits may operate at the voltage $V_{DIG}$=0.7 ... 1.2V. Another reason for reducing the digital supply voltage would be the fact that the dynamic power consumption of digital circuits is proportional to the square of its supply voltage.

For simplification, one could supply the digital circuits directly from the battery voltage. However, an issue would be again the current ripple produced on the battery at audio frequencies by the duty-cycled current consumption of the digital block, because the digital block works in synchronisms with the radio.

This problem may be overcome by supplying the digital circuits at a lower voltage $V_{DIG}$ produced from the filtered voltage $V_{RADIO}$ through a step-down DC/DC converter (buck converter) using a coil. As described above, the step-up DC/DC converter 95 of FIG. 14 used to generate the supply voltage $V_{RADIO}$ of the transceiver 61 works in a burst mode with a duty-cycle lower than 1. The coil 96 of the boost converter may be used by the buck converter for generating $V_{DIG}$ during the periods when the coil 96 is not used by the boost converter.

Figure 16:
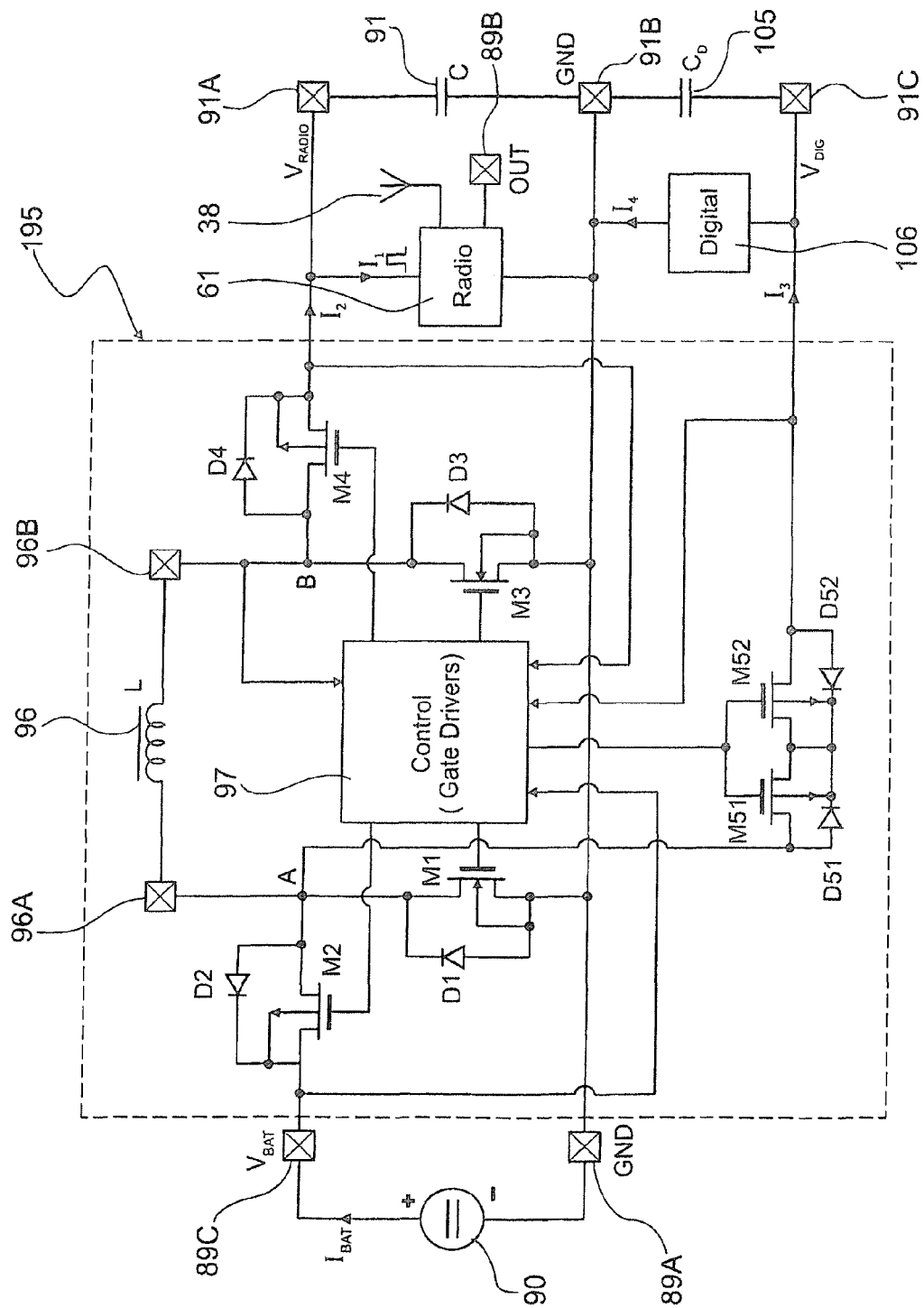
FIG. 16 is a block diagram of an another alternative example of the receiver unit of FIG. 11.

In FIG. 16 a schematic of an example of such a supply system for the receiver unit 14 is shown, wherein a digital block 106 is supplied from the voltage converter 195 (acting as a boost/buck DC/DC converter, with a capacitor 105 being connected in parallel to the digital block 106. The capacitor 105 is provided for filtering the current ripple produced by the operation of the digital block 106. Usually, the capacitor 105 is connected in parallel to the digital block 106 through specific contact pads 91B and 91C.

The boost/buck converter 195 includes 6 MOS transistors M1, M2, M3, M4, M51 and M52 that act as switches, a coil 96 connected to the switches through specific contacts 96A and 96B, a control block 97 and 6 diodes D1, D2, D3, D4, D51 and D52. The diodes D1, D2, D3, D4, D51 and D52 are the drain substrate diodes of MOS transistors M1, M2, M3, M4, M51 and M52, respectively.

The control block 97 provides appropriate voltage levels for switching ON or OFF the MOS transistors M1, M2, M3, M4, M51 and M52 at the right time; for achieving this task, the control block 97 monitors the battery voltage $V_{BAT}$, the output voltage $V_{RADIO}$, the voltage level at contact 96B (Node B) and the output voltage $V_{DIG}$.

Figure 17:
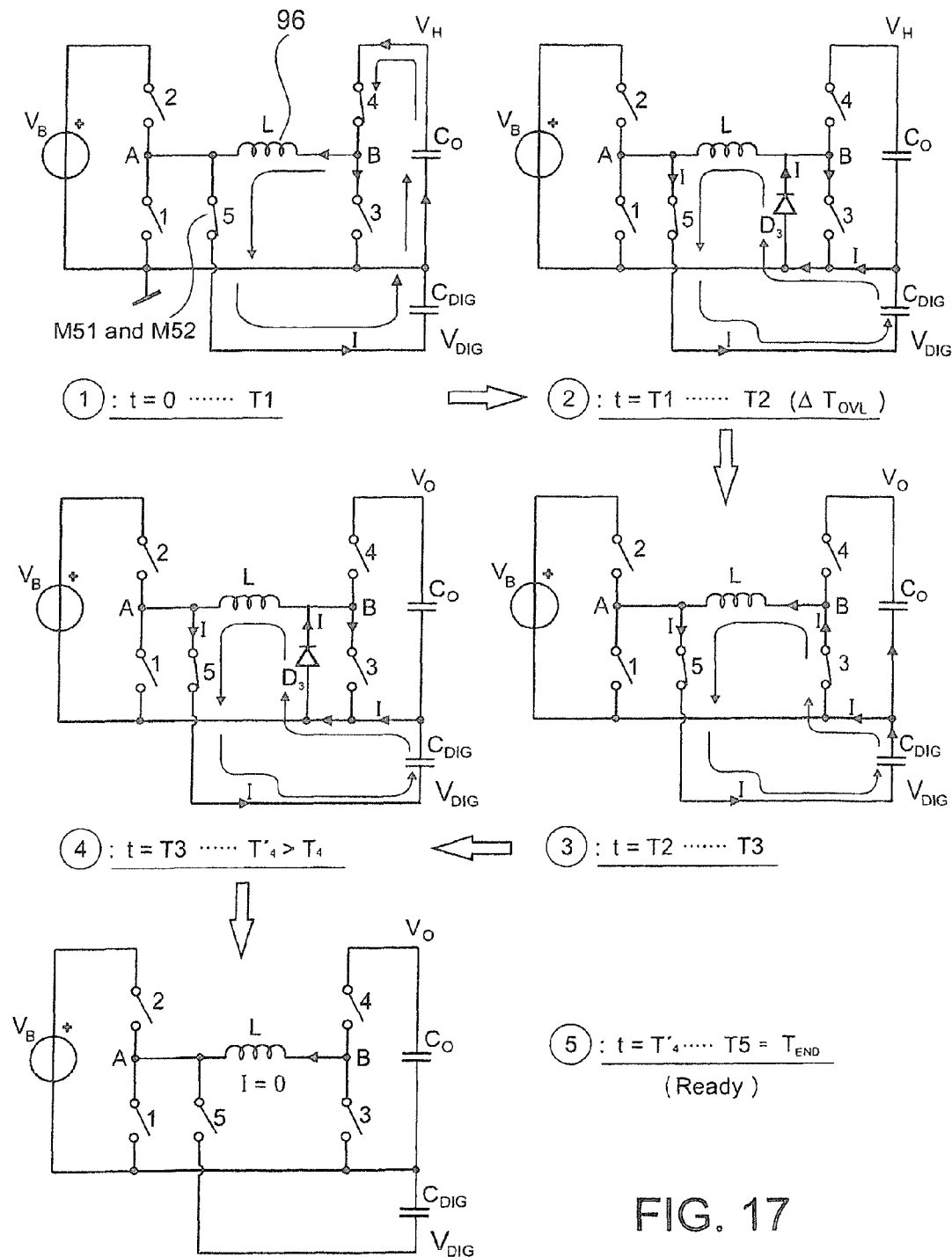
FIG. 17 shows a sequence of five phases of the current flow during operation of the receiver unit of FIG. 16.

Operation of the boost converter has already been described with regard to FIG. 15. Operation of the buck (step-down DC to DC) converter which supplies the digital block 106 will be described with regard to FIGS. 16 and 17. The current $I_3$ that is delivered to the digital block 106 and the capacitor 105 is proportional to the number of cycles. The number of working cycles per second that is needed for proper operation is defined by the control block 97 in function of the output voltage $V_{DIG}$ over capacitor 105. In FIG. 17, the different phases of a working cycle of the buck converter are shown. The buck converter uses the coil 96 and the switches M3, M4, M51 and M52 during the time when these elements are not used for the operation of the boost converter.

Before start of a buck converter cycle, all switches M1, M2, M3, M4, M51 and M52 are open and the current through the coil 96 is zero.

Phase 1: At start (time t=0) the switches M4, M51 and M52 (M51 and M52 are shown as a single element "5" in FIG. 17) are closed and M3 remains open. In this way, the current flowing through the coil 96 increases linearly with time, flowing from the higher voltage $V_{RADIO}$ (=VH) through the switch M4, the coil 96, the switches M51 and M52, the capacitor 105 and the capacitor 91. This current charges also the output capacitor 105.

Phase 2: At time t=T1, the switch M4 opens. This will not stop the current flowing through the coil 96, as a coil naturally opposes to current variations; the coil will drive the voltage at node B below that of GND node. Diode D3 becomes conductive and the current continues flowing through the switches M51 and M52, the coil 96, the diode D3, the reference node GND and the capacitor 105; this current charges also the output capacitor 105.

Phase 3: At time T2, the switch M3 closes, providing a short circuit of diode D3. This improves the transfer of the energy that was stored into the coil 96 during the phase 1 to the capacitor 105 as there is no more voltage drop over the diode D3. The time duration of precedent phase 2, $T_2-T_1=\Delta T_{OVL}$ is called "non overlap time". This time is needed for insuring that switch M4 opens before switch M3 closes; this prevents a direct conduction path through M3-M4. For saving energy, the "non overlap time" T2−T1 has to be kept as low as possible. During the time interval T3−T2, the current flowing through the coil 96 decreases, while charging the output capacitor 105.

Phase 4: At time T3, the control block 97 opens again the switch M3. Time T3 is chosen by the control block 97 as a point in time before the current through the coil 96 reverses sense. The control block 97 monitors the voltages at node 96B for deciding the right moment to switch M3 OFF. The residual current through the coil 96 continues flowing through the reference node GND, the diode D3, the switches M51 and M52 and the capacitor 105, delivering its residual energy to the output capacitor 105. At time T4, the current through the coil reaches 0 value. The diode D3 ceases conduction and the voltage at node B goes to the $V_{DIG}$ voltage level.

Phase 5: At time $T_4'>T_4$ the control block 97 opens the switches M51 and M52 again. Until end of this phase (guard time), all switches are open and the current through the coil is zero. At time T5, the converter is ready for starting a new working phase, either in boost converter or in buck converter operation.

The control block 97 will adjust the number of working cycles per second for maintaining the output voltage $V_{DIG}$ of node 91C at a fixed value. In contrary to the boost converter, it can do that with a short time constant. Smooth time constants are not needed as the buck converter takes its energy from the boost converter node 91A that is already filtered.

Figure 14:
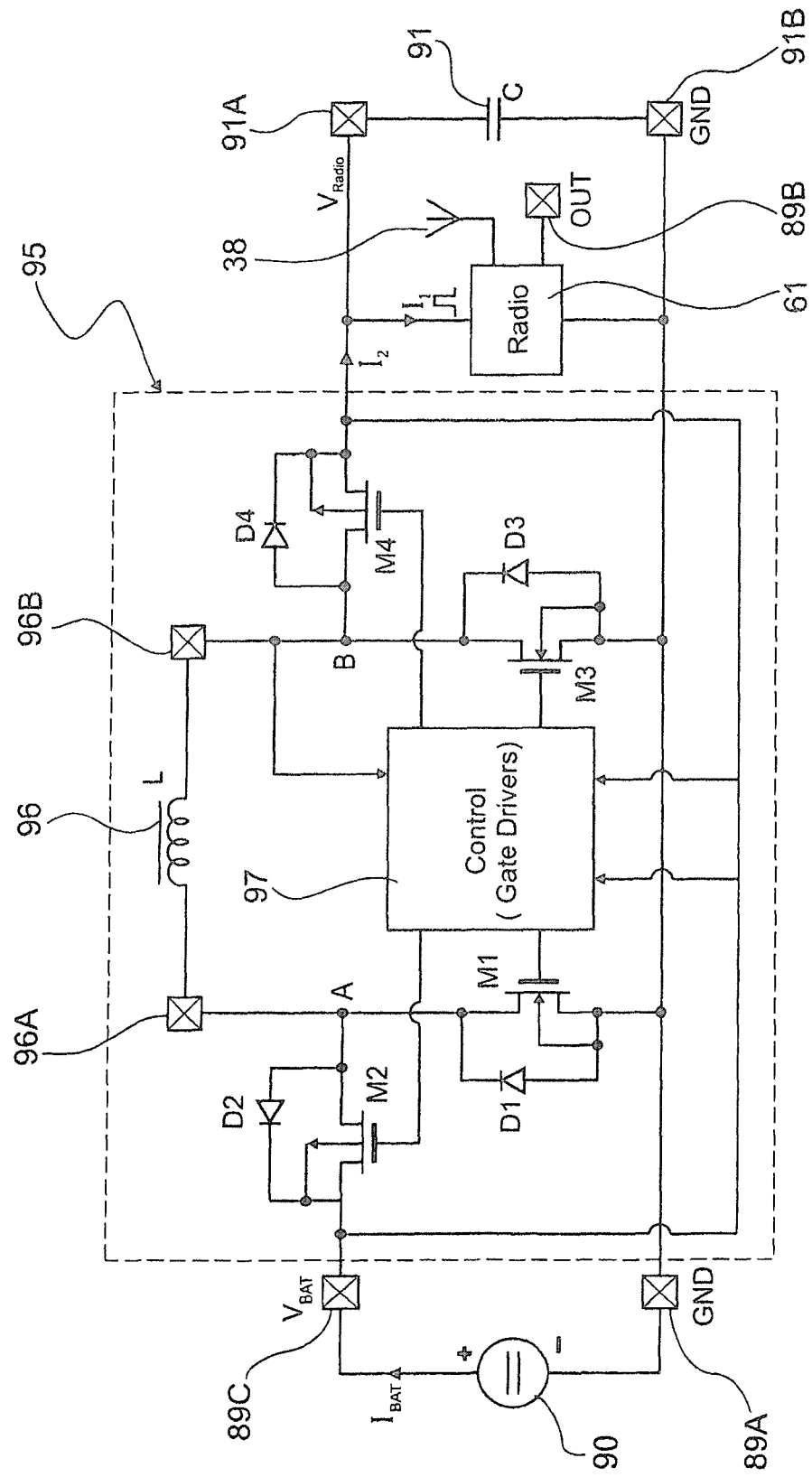
FIG. 14 is a block diagram of an alternative example of the receiver unit of FIG. 11.
Figure 15:
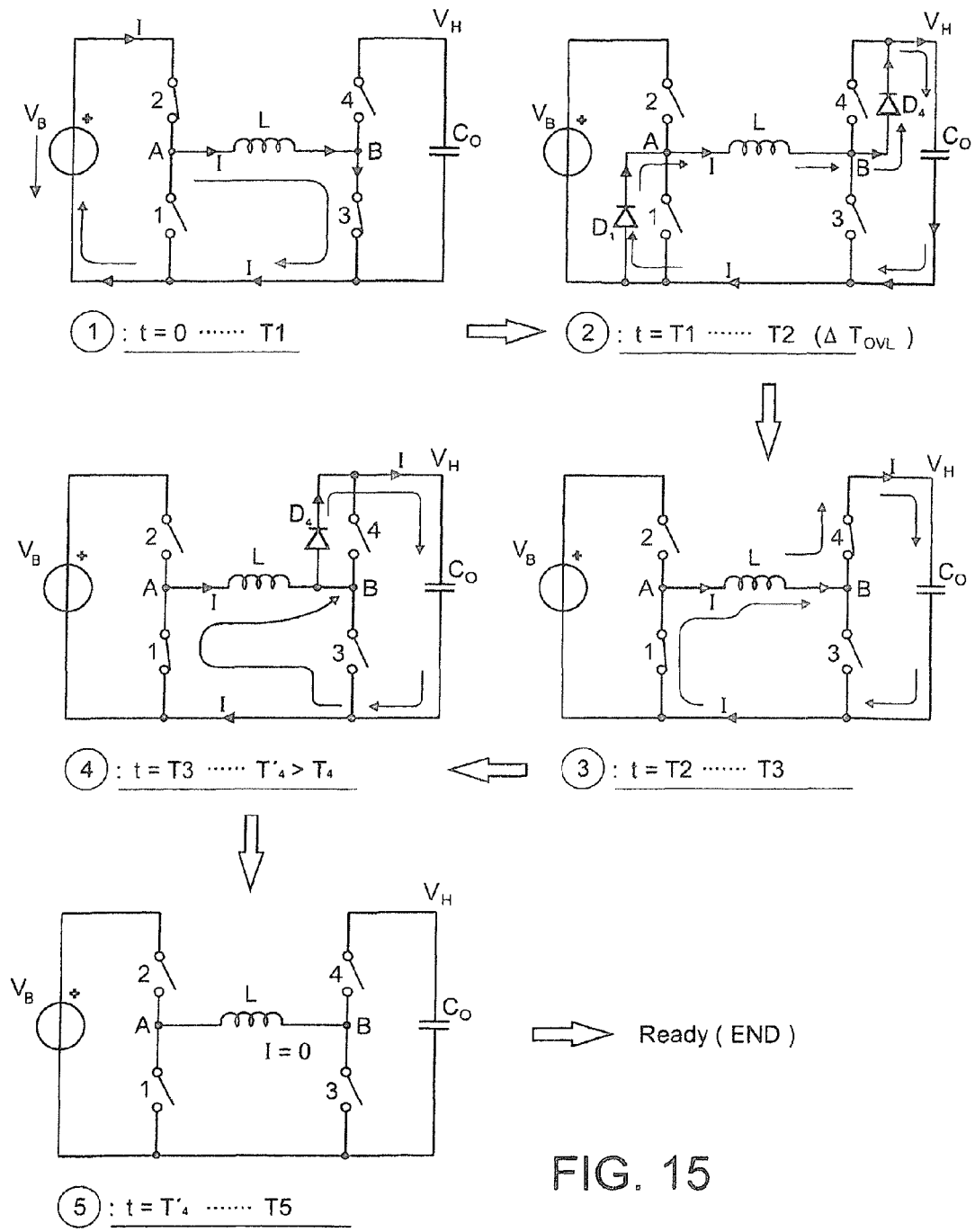
FIG. 15 shows a sequence of five phases of the current flow during operation of the receiver unit of FIG. 14.

It is noted that, although not shown in FIGS. 14 and 16 for the sake of clarity, the shunt regulator 96 of FIG. 12 preferably is maintained for safety reasons (with the boost converter architecture the shunt regulator 96 is not necessarily needed; the reason is that if the current $I_2$ taken by the radio goes down, the output voltage $V_{RADIO}$ will raise but stop at a higher value automatically as the power delivered by the coil for a fixed duty-cycle (DC) is constant; then the product $V_{RADIO}*I_2$ also will be constant.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims

What is claimed is:

1. A system for providing hearing assistance to at least one user, comprising: at least one audio signal source for providing audio signals; a transmission unit comprising a digital transmitter for applying a digital modulation scheme in order to transmit the audio signals as data packets according to a frame structure from the audio signal source via a wireless digital audio link; at least one receiver unit for reception of audio signals from the transmission unit via the digital audio link, wherein the receiver unit is connected to or integrated within an ear- worn device comprising a power source and means for stimulating a hearing of the user(s) according to audio signals supplied from the receiver unit, wherein the receiver unit comprises a digital transceiver which is powered by a power source of the ear-worn device and which is adapted to at least listen during part of each frame and to sleep during the remainder of the frame; wherein the receiver unit comprises a capacitor connected in parallel to the transceiver for supplying the transceiver during listening or transmission operation with current and for being recharged by the power source of the ear-worn device and a controlled current source including a control unit for controlling the current flowing from the power source to the transceiver and the capacitor in a manner so as to prevent changes in the current flowing from the power source to the transceiver and the capacitor caused by the transceiver switching between sleeping and listening/transmission operation and vice versa, respectively, which are expected to add an audible noise signal to the audio signals supplied to the stimulation means, wherein the controlled current source includes a voltage multiplier for increasing a voltage provided by the power source, and wherein the voltage multiplier is a step-up DC/DC converter having its input connected to the power source and delivering an output voltage to the capacitor and the transceiver having a value set between a lower limit and an upper limit, and wherein the controlled current source is adapted to adjust the current flowing from the power source to the transceiver and the capacitor to a constant target current value selected according to an estimated quality of the audio link or according to the estimated average current consumption of the transceiver.

2. The system of claim 1, wherein the controlled current source and the capacitor are designed to keep the current flowing from the power source to the transceiver within ±0.1% at a target value.

3. The system of claim 1, wherein the controlled current source is adapted to adjust, in case of a deterioration of the estimated quality of the audio link, the current to a new target current value corresponding to the changed quality of the audio link with a time constant of at least 0.05 s.

4. 4 The system of claim 1, wherein the controlled current source is adapted to adjust, in case of an improvement of the estimated quality of the audio link, the current to a new target current value corresponding to the changed quality of the audio link with a time constant of from 0.5 to 1 s.

5. The system of claim 1, wherein the controlled current source is adapted to select the target current value at the estimated average current to be consumed by the transceiver plus a safety overhead of up to 20% to account for transient changes in link quality.

6. The system of claim 1, wherein the controlled current source is adapted to an estimate of the link quality from an output signal of the transceiver indicative of at least one of a packet level error rate and a bit level error rate of the received audio signals.

7. The system of claim 1, wherein the controlled current source is adapted to monitor a voltage across the transceiver in a manner so as to keep it below a given threshold.

8. The system of claim 7, wherein the receiver unit is adapted to cause dummy discharge of the capacitor to keep the voltage across the transceiver below the given threshold.

9. The system of claim 8, wherein a shunt regulator connected in parallel to the capacitor is provided to cause dummy discharge of the capacitor to keep the voltage across the transceiver below the given threshold.

10. The system of claim 1, wherein the receiver unit comprises a voltage multiplier for increasing the voltage provided by the power source and for supplying the increased voltage to the controlled current source.

11. The system of claim 1, wherein the ear-worn device is a hearing aid.

12. The system of claim 11, wherein the receiver unit is connected to the hearing aid via a three-pin connector, including an audio signal pin, a power supply pin and a common ground pin.

13. The system of claim 1, wherein the transceiver is adapted to listen only during less than 10% of each frame.

14. The system of claim 1, wherein the step-up DC/DC converter is adapted to keep its input current drawn from the power source independent from its output voltage.

15. The system of claim 14, wherein the DC/DC converter is a bridged boost converter.

16. The system of claim 15, wherein the DC/DC converter comprises a coil for supplying the current from the power source through the coil to the capacitor and a plurality of switches, with the coil forming part of the bridge.

17. The system of claim 16, wherein the DC/DC converter is adapted to control the switches in a manner so as to operate in a cyclic discontinuous mode, wherein for a first time interval of each cycle the current through the coil is zero, wherein for a second time interval of each cycle current is drawn from the power source for energizing the coil, with the capacitor being disconnected from the coil, and wherein for a third time interval the capacitor is supplied with current from the coil, with the power source being disconnected from the coil.

18. The system of claim 17, wherein the DC/DC converter is adapted to select the second time interval independent from the converter output voltage.

19. The system of claim 17, wherein the DC/DC converter is adapted to control the switches according a power source voltage, a capacitor voltage and a voltage at the coil.

20. The system of claim 17, wherein the DC/DC converter is adapted to change a duty cycle of the coil as a function of a power source voltage and a capacitor voltage in order to keep the voltage across the transceiver below said given threshold.

21. The system of claim 17, wherein a duty cycle is provided having fundamental frequency of at least 16 kHz.

22. The system of claim 17, wherein the DC/DC converter comprises a fractional N-divider realized by a multi-modulus divider driven by a delta-sigma-modulator for changing a duty cycle of the coil.

23. The system of claim 18, wherein the controlled current source comprises also a step-down DC/DC converter having its input connected to the power source and delivering an output voltage for supplying a digital circuitry lower than a power source voltage, wherein a second capacitor is connected in parallel to the digital circuitry.

24. The system of claim 23, wherein the step-down DC/DC converter is adapted to share the coil of the step-up DC/DC converter.

25. The system of claim 24, wherein the step-down DC/DC converter is adpted to use the coil of the step-up DC/DC converter during the times when the coil is not used by the step-up DC/DC converter.

26. The system of claim 1, wherein the transmission unit is adapted to transmit each data packet in a separate slot of a TDMA frame, wherein each audio data packet comprises a start frame delimiter, audio data and a frame check sequence, and wherein the digital transceiver of the receiver unit(s) is adapted to verify each received data packet by using the frame check sequence and to use the audio data of the first verified version of each data packet as the signal to be supplied to the stimulation means, while not using the audio data of other versions.

27. The system of claim 26, wherein the transceiver is adapted to sleep at least during times when no data packets are to be expected.

28. The system of claim 1, wherein the audio signal source is a microphone arrangement integrated into or connected to the transmission unit for capturing a speaker's voice.

29. The system of claim 1, wherein the digital transceiver is adapted to listen and transmits during part of each frame and to sleep during the remainder of the frame.

30. A method for providing hearing assistance to at least one user, comprising:
   providing audio signals from at least one audio signal source to a transmission unit comprising a digital transmitter for applying a digital modulation scheme;
   transmitting audio signals as data packets according to a frame structure via a digital wireless audio link from the transmission unit to at least one receiver unit connected to or integrated within an ear-worn device and comprising a digital transceiver, the ear-worn device comprising a power source which is used for powering the digital transceiver, wherein the digital transceiver at least listens during part of each frame and sleeps during a remainder of the frame;
   stimulating, by using the ear-worn device, the hearing of the user(s) according to audio signals supplied from the receiver unit;
   wherein the transceiver during listening or transmission operation is supplied with current by a capacitor connected in parallel to the transceiver, wherein the capacitor is recharged by the power source of the ear-worn device, and wherein the current flowing from the power source to the transceiver and the capacitor is controlled by a controlled current source in a manner so as to prevent changes in the current flowing from the power source to the transceiver and the capacitor caused by the transceiver switching between sleeping and listening/transmission operation and vice versa, respectively, which are expected to add an audible noise signal to the audio signals supplied to the stimulation means.

31. The method for providing hearing assistance to at least one user according to claim 30, wherein the digital transceiver listens and transmits during part of each frame and sleeps during the remainder of the frame.

* * * * *